Sept. 17, 1957 W. F. EAMES 2,806,553

ELEVATOR SYSTEMS

Filed Feb. 25, 1955 9 Sheets-Sheet 1

Sept. 17, 1957 W. F. EAMES 2,806,553

ELEVATOR SYSTEMS

Filed Feb. 25, 1955 9 Sheets-Sheet 2

Sept. 17, 1957 W. F. EAMES 2,806,553

ELEVATOR SYSTEMS

Filed Feb. 25, 1955 9 Sheets-Sheet 4

Sept. 17, 1957 W. F. EAMES 2,806,553

ELEVATOR SYSTEMS

Filed Feb. 25, 1955 9 Sheets-Sheet 8

ELEVATOR SYSTEMS

Filed Feb. 25, 1955

9 Sheets-Sheet 9

2,806,553

ELEVATOR SYSTEMS

William F. Eames, Westfield, N. J., assignor to Westinghouse Electric Corporation, East Pittsburgh, Pa., a corporation of Pennsylvania Application February 25, 1955, Serial No. 490,483

36 Claims. (Cl. 187—29)

This invention relates to elevator systems and it has particular relation to elevator systems which are designed for operation without car attendants.

Although aspects of the invention may be employed in elevator systems having car attendants, the invention is particularly desirable for elevator systems of the automatic type which do not have car attendants. For this reason, the invention will be discussed with particular reference to such operatorless systems.

When an elevator car in an operatorless system stops at a landing, such as a floor of a building or structure, it is the practice to hold the elevator car at the floor for a substantial time with its doors open in order to permit loading and unloading of the elevator car. This time is referred to as a non-interference time. In some cases, the non-interference time may be of the order of 5 or more seconds for each stop. If a dispatcher is employed at a terminal landing or floor, the non-interference time may be provided to permit unloading of the elevator car at the terminal floor.

Prior art elevator systems also have provided mechanism permitting persons to open or prevent closure of the elevator car doors. Such mechanism may include a door-hold button which when operated prevents elevator car doors from closing or reopens partially closed elevator car doors.

In addition, the edge of an elevator car door which during door closure is the leading edge has been provided with mechanism which is operated as the door approaches a person positioned in the closing path of the door for the purpose of reopening the door.

A further door control has been provided wherein a light beam has been directed horizontally across an opening which is closed and exposed by the elevator car door. Interruption of the light beam has been employed for reopening a partially closed door and for preventing closure of the door as long as the light beam is interrupted.

In accordance with the invention, controls are provided for preventing a person from unduly preventing closure of an elevator car door. Thus, if a person operates a door-hold button for an undue period of time, or if he operates a safety device on the edge of the door for an undesirably long period of time, suitable remedial actions are initiated. Such remedial actions may include the operation of a signal, such as a voice signal, a light or a buzzer in the vicinity of the door, for the purpose of advising or signaling the person to release the door. In addition, signals may be operated at floors displaced from the elevator car for the purpose of advising prospective passengers that the elevator car door is being held open. If desired, the remedial action may be permitted only if a predetermined service demand exists on the elevator system at the same time. Such a service demand may be represented by registration of a plurality of calls for service from floors displaced from the elevator car by prospective passengers.

If a light beam is employed in the manner above described, the remedial controls may include mechanism effective if the beam of light is interrupted for more than a predetermined time for rendering such interruption ineffective to delay closure of the elevator car door.

The invention further contemplates improvements in the operation of a door in response to actuation of devices associated with the edge of the door, such as a safety edge. In accordance with one aspect of the invention, the door may be controlled to follow the safety edge. Thus, if the safety edge is held stationary, the door also remains stationary. Movement of the safety edge in any direction is accomplished by a following movement of the associated door. This might be termed "Power-aided-control of door position."

In a modified embodiment of the invention, a brief operation of the safety edge is effective for stopping the associated door. Closing movement of the door resumes in response to release of the safety edge. However, operation of the safety edge for a substantial period of time results in reopening of the associated door. Conveniently, an auxiliary button is provided in an elevator car which is effective when operated for stopping a closing movement of the elevator car door provided the elevator car door has not closed substantially and retaining the door in its stopped position until the button is released.

A further aspect of the invention relates to a control which is effective for decreasing or eliminating the non-interference time of an elevator car in response to a predetermined loading of the elevator car or of a bank of elevator cars. At the same time, the door of the elevator car may be arranged to close slowly under the influence of an increased closing force, regardless of the operation of any associated door-hold button or safety edge. If desired, operation of such a safety edge may be employed for momentarily halting the door and thereafter continuing the door-closing motion at a lower speed under the influence of a larger closing force.

The approach of a prospective passenger at a point substantially displaced from the elevator car may be detected by a suitable detector. The invention contemplates that operation of the detector is effective for delaying door closure of the elevator car for a period extending beyond the normal non-interference time of the door.

It is, therefore, an object of the invention to provide improved controls for the door of an elevator car.

It is a second object of the invention to provide remedial mechanism which is operable in response to prevention of the closure of the door of an elevator car for a predetermined time.

It is a third object of the invention to provide a system as defined in the preceding paragraph wherein operation of the remedial mechanism further requires the presence of a predetermined service demand for the elevator car.

It is a fourth object of the invention to provide a door-operating mechanism which forces the door to follow movement of an object adjacent an edge of the door.

It is a fifth object of the invention to provide a door-control mechanism for an elevator system which is responsive to a brief operation of an operating device for briefly interrupting a closing movement of the door and which is responsive to an operation of the operating device for a substantial period of time for reversing the movement of the door.

It is a sixth object of the invention to provide a mechanism operable for stopping and holding stationary a closing door of an elevator car provided such door has not closed beyond a predetermined point.

It is a seventh object of the invention to provide an elevator system wherein the non-interference time of an elevator car is modified as a function of the load of the elevator car or of a bank with which the car is associated.

It is an eighth object of the invention to provide a system as defined in the preceding paragraph wherein the modification of the non-interference time is accompanied by a modification in the control of an elevator car door.

It is a ninth object of the invention to incorporate in an elevator system having an elevator car provided with a door which closes following expiration of a non-interference time and which may be reopened in response to presence of an object in the closing path of the door, a control responsive to the loading of the elevator car or of a bank with which it is associated for modifying the non-interference time and for preventing such reopening of the door.

It is a tenth object of the invention to provide an elevator system as defined in the preceding paragraph wherein the predetermined loading modifies the door control to cause the door to close at reduced speed under an increased closing force.

It is an eleventh object of the invention to provide a system as set forth in the penultimate paragraph wherein such loading modifies the door closure to cause the door to pause briefly in response to the presence of an object in the closing path of the door and thereafter to continue its closing movement at reduced speed under an increased closing force.

It is a twelfth object of the invention to provide an elevator system having a detector for detecting the approach of a prospective passenger of an elevator car at a point displaced substantially from the elevator car, and mechanism for delaying departure of the elevator car in response to operation of the detector.

Other objects of the invention will be apparent from the following description taken in conjunction with the accompanying drawings, in which.

Figure 2:
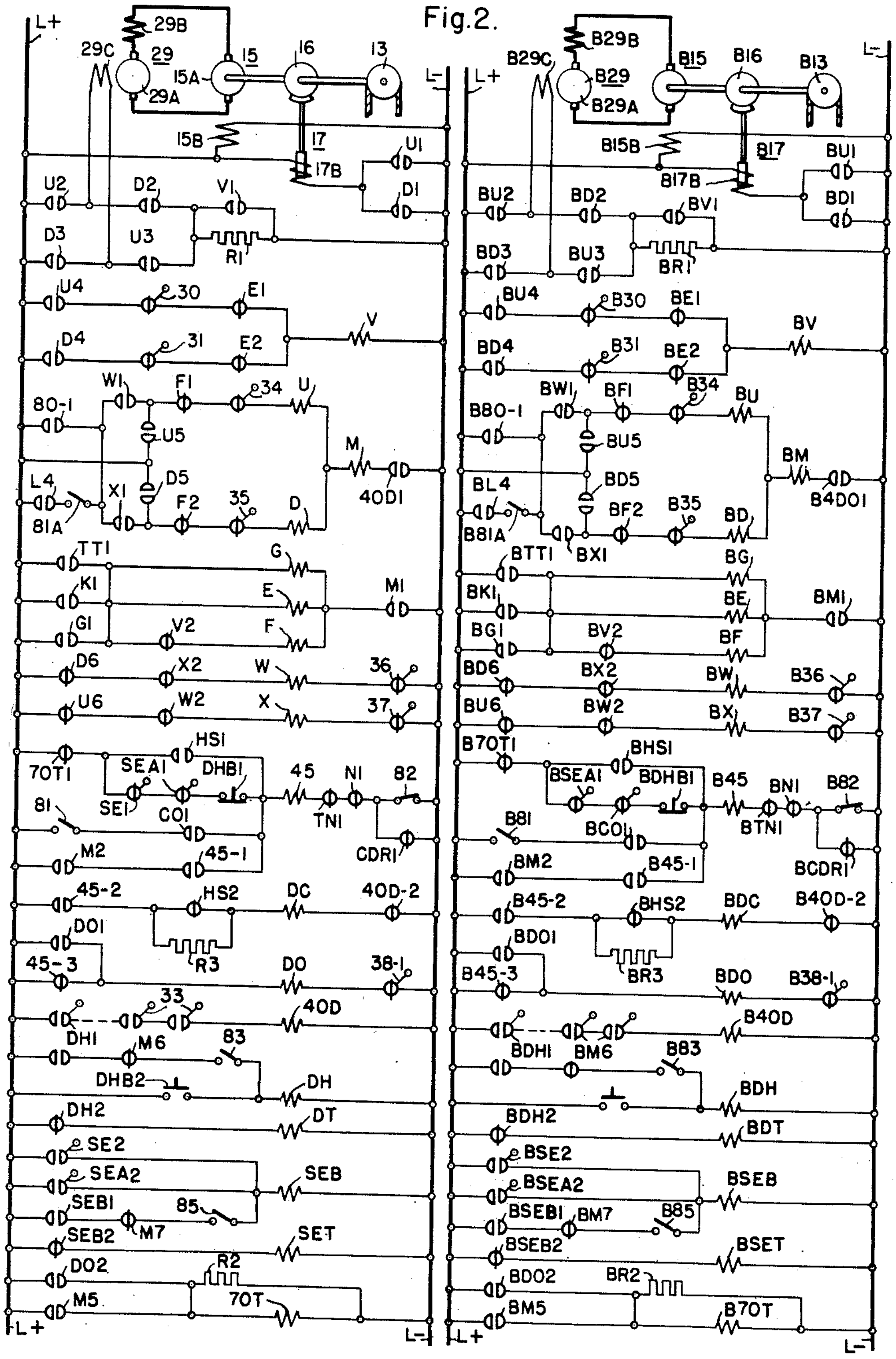
Figs. 2, 3 and 4 are schematic views including circuits in straight-line form of a control system embodying the invention.
Figure 2A:
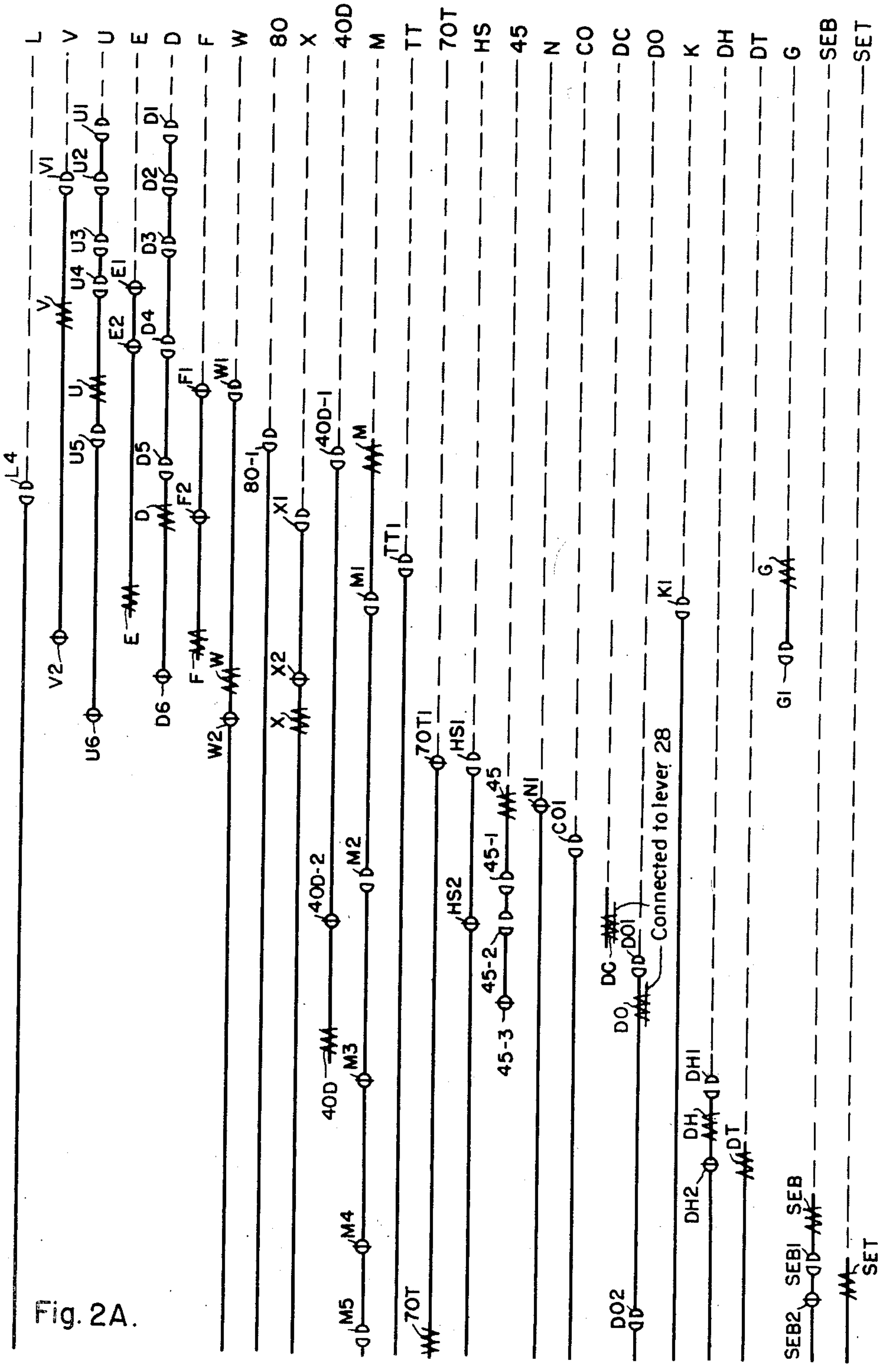
Figure 3:
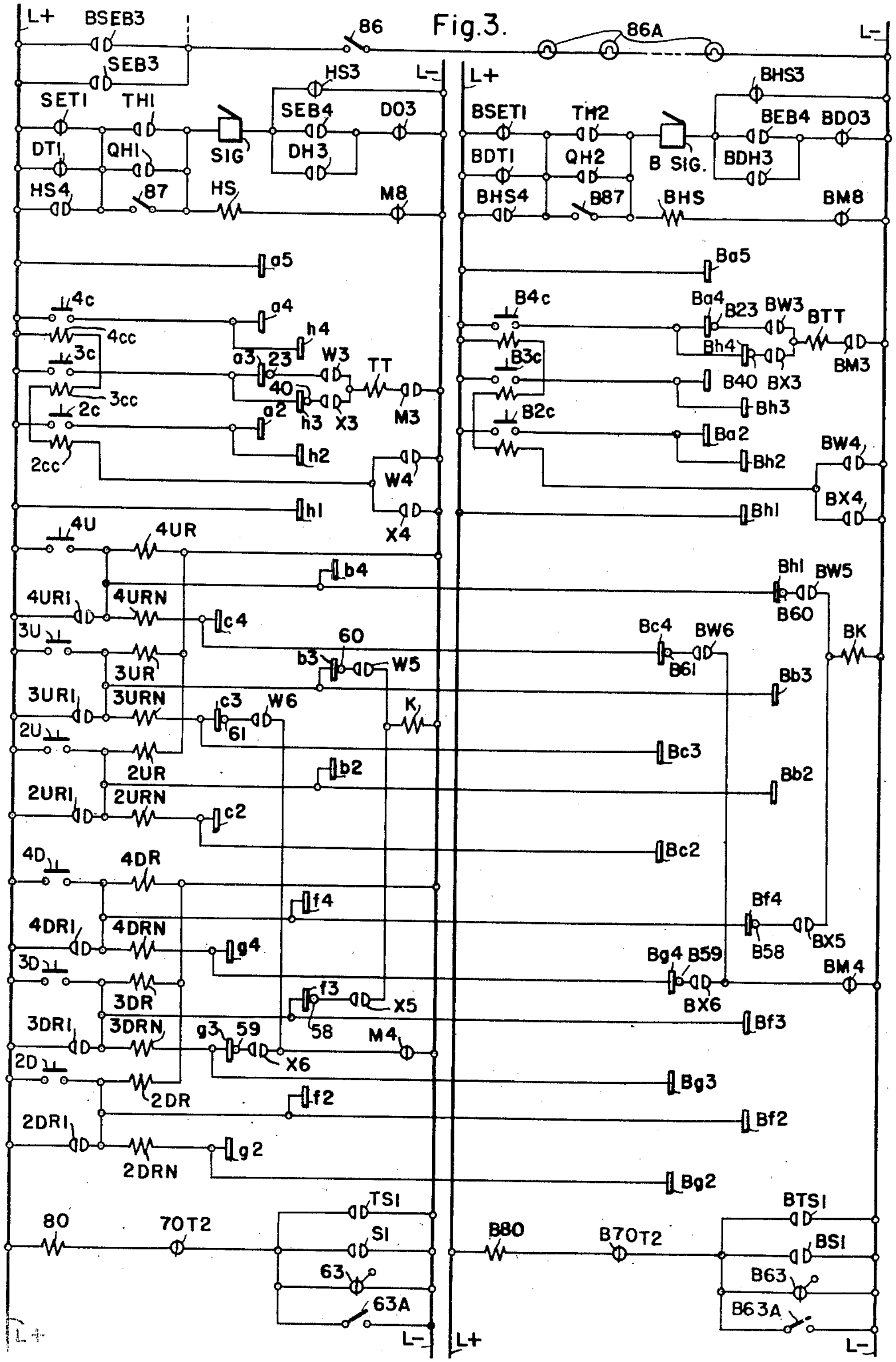
Figure 3A:
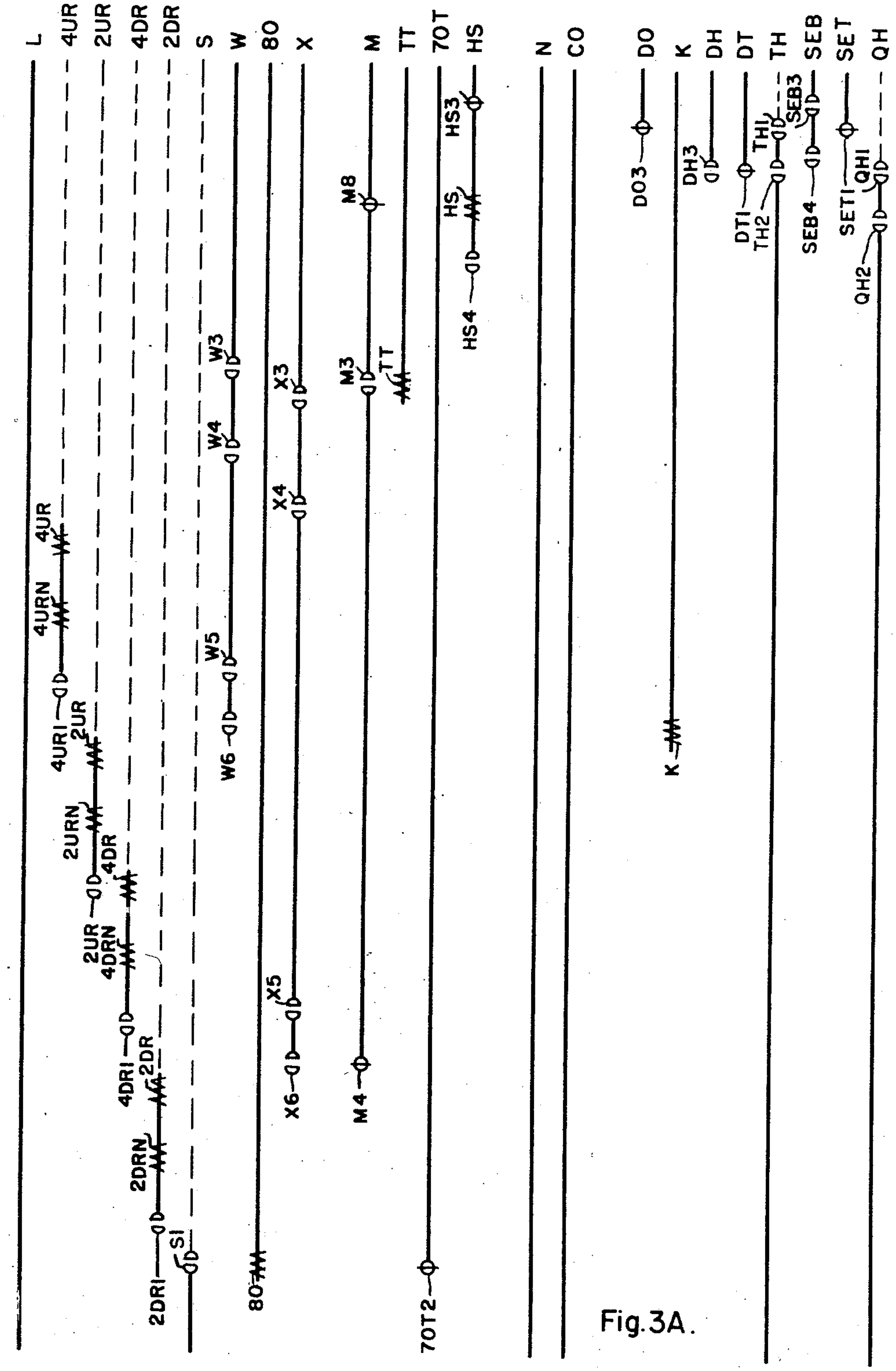
Figure 4:
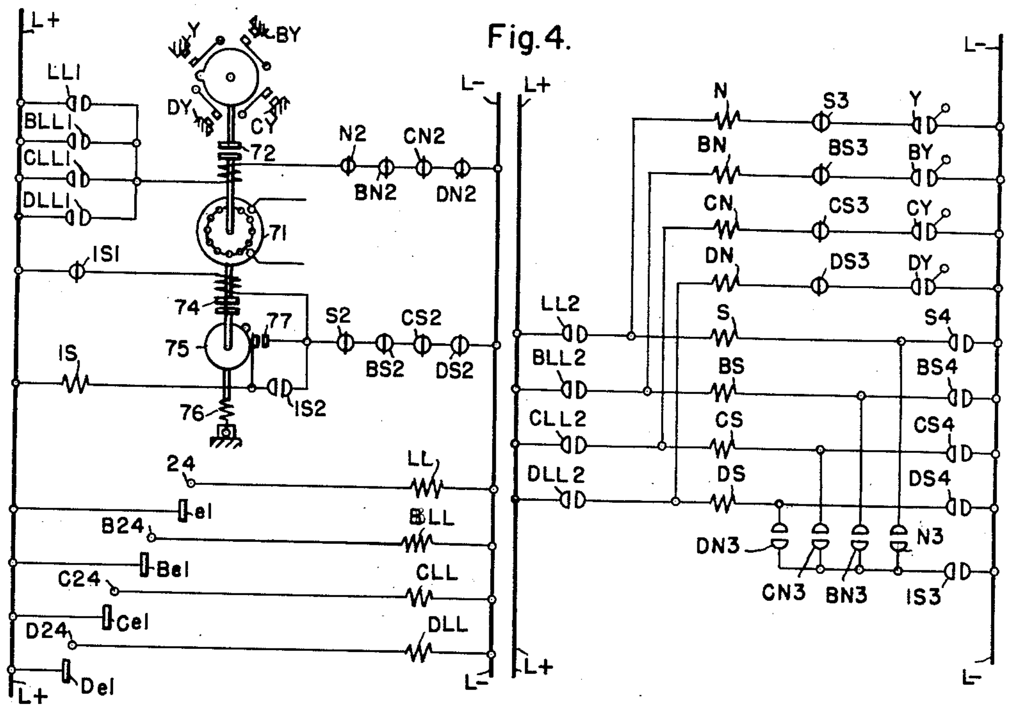
Figure 5:
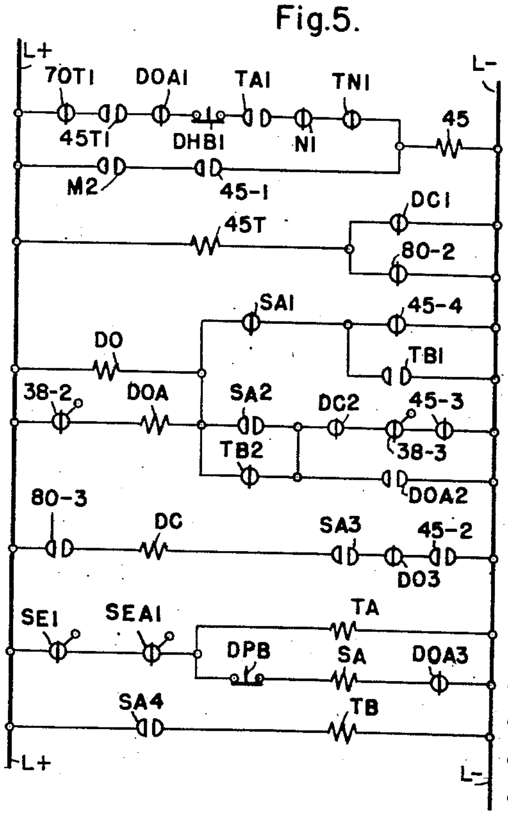
Figure 6:
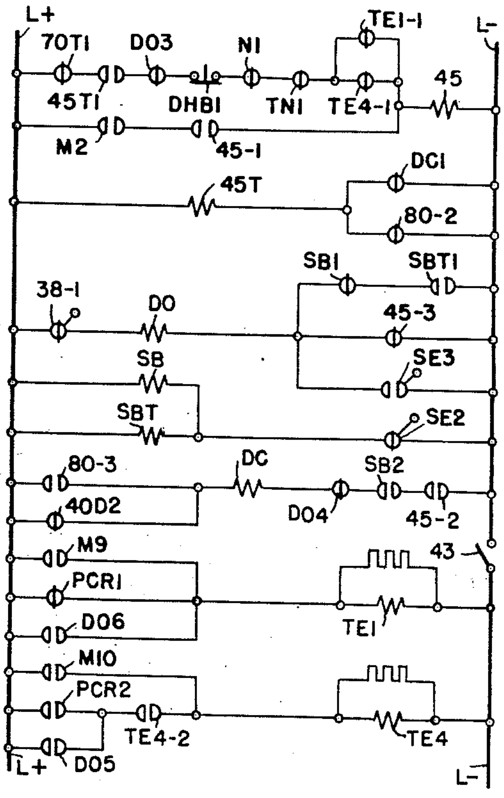
Figure 4A:
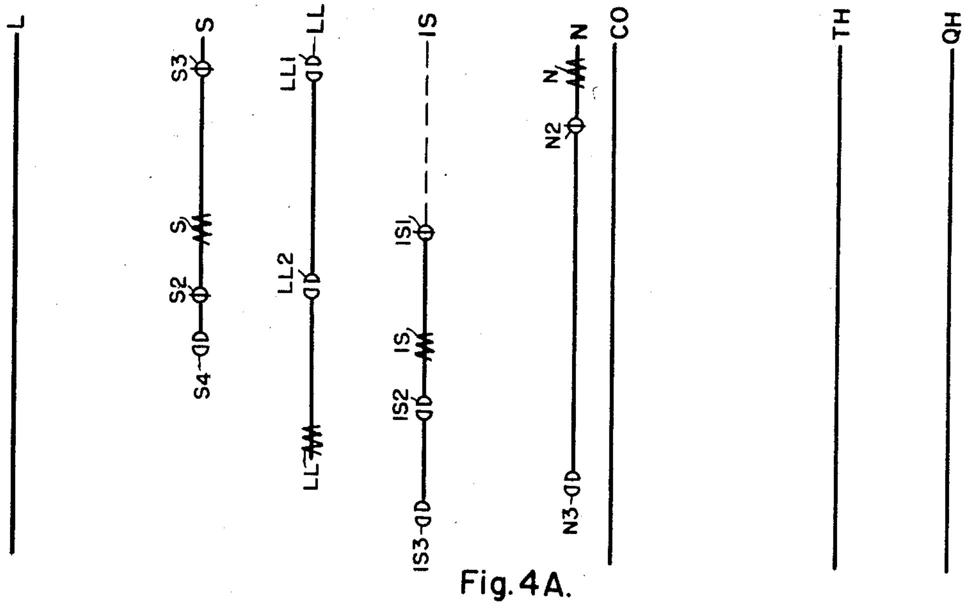
Figure 5A:
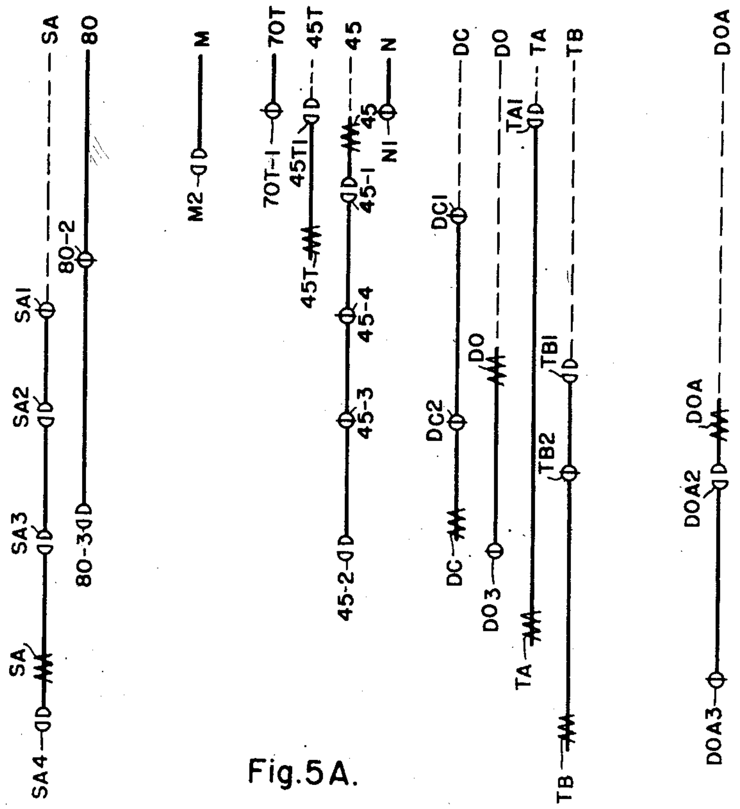
Figure 7:
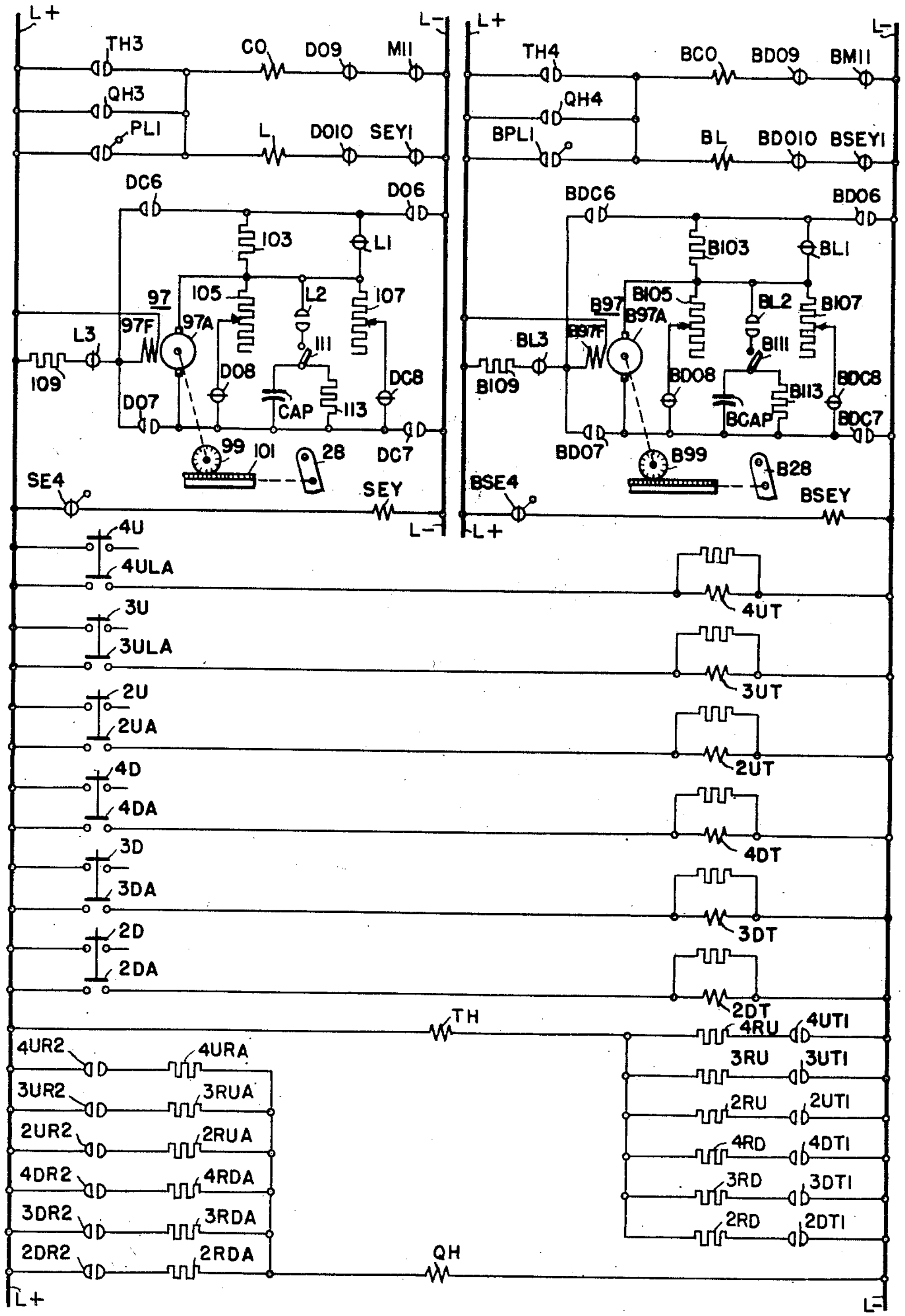
Figures 7A, 8:
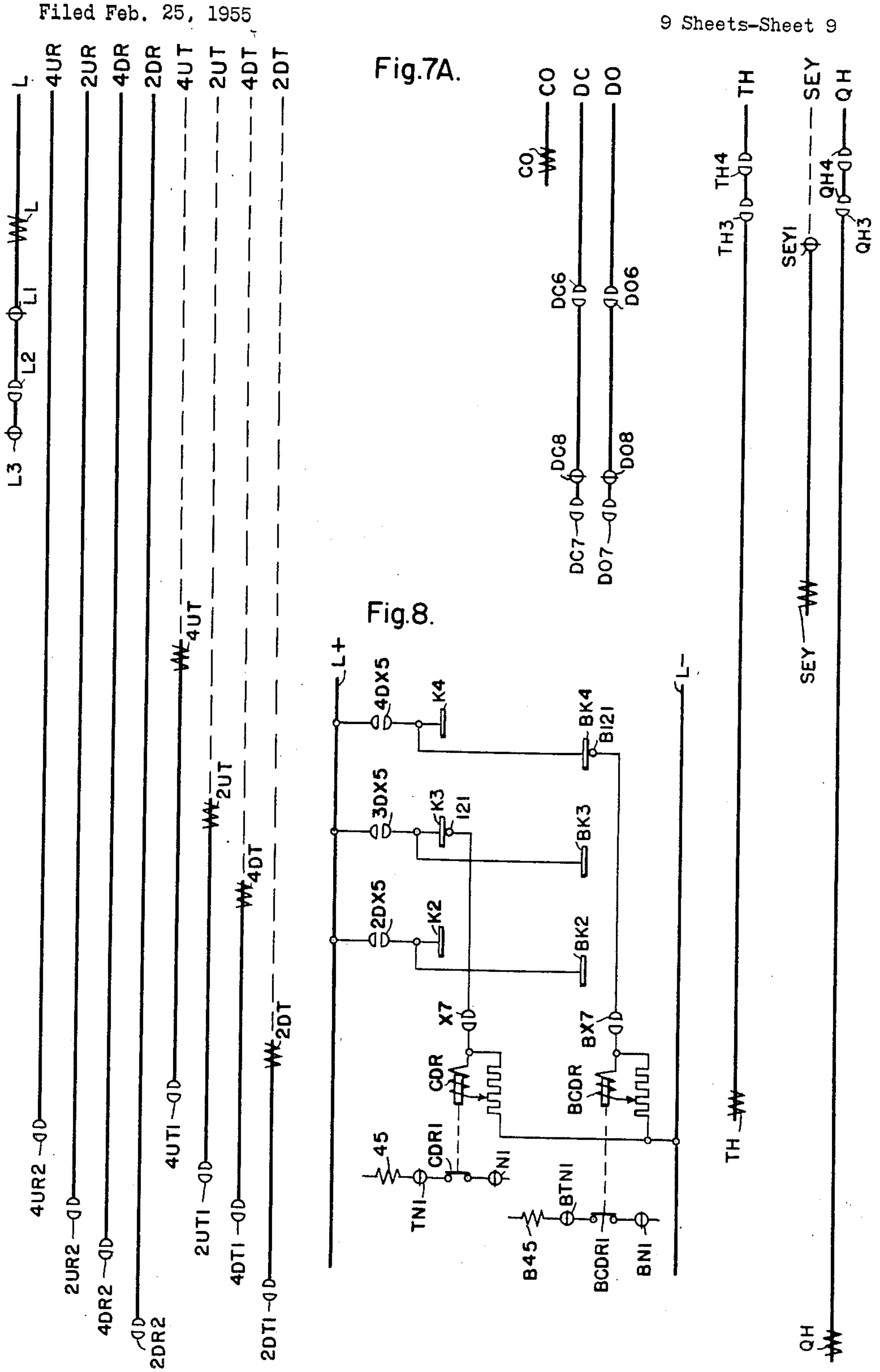

Figs. 2A, 3A and 4A are key representations of electromagnetic relays and switches employed in the circuits of Figs. 2, 3 and 4. If Figs. 2, 3 and 4 are horizontally aligned respectively with Figs. 2A, 3A and 4A, it will be found that coils and contacts of the switches and relays appearing in the key representations are horizontally aligned with the corresponding coils and contacts shown in these circuits;

Figs. 5, 6, 7 and 8 are schematic views in straight line form showing control circuits which embody modified forms of the invention; and Figs. 5A and 7A are key representations of electromagnetic relays and switches employed in the circuits of Figs. 5 and 7, respectively.

Although the invention may be incorporated in an elevator system employing various numbers of elevator cars serving buildings or structures having various numbers of floors, the invention can be described adequately with reference to an elevator system having four elevator cars serving a building having five floors. The elevator cars may be dispatched from any desired floors. The elevator cars will be assumed to be dispatched from the first floor and the upper terminal or fifth floor.

Because of the complexity of such systems, certain conventions have been adopted. The elevator cars will be identified by the reference characters A, B, C and D. Since the circuits for the cars are similar, substantially complete circuits are shown for the cars A and B. Components associated with the cars C and D are discussed only as required.

Components associated with the elevator cars B, C and D which correspond to a component of the elevator car A are identified by the same reference character employed for the component of the elevator car A preceded by the letters B, C and D, respectively. For example, the reference characters U, BU, CU and DU designate up switches, respectively, for the elevator cars A, B, C and D. The discussion will be directed primarily to the apparatus and circuits for the elevator car A.

The various relays and switches employed in the circuits may have break or back contacts which are closed when the relay is deenergized and dropped out. The break contacts are open when the relays or switches are energized and picked up.

The relays and switches also may have front or make contacts which are opened when the switches and relays are deenergized and dropped out. These contacts are closed when the switches and relays are energized and picked up. In the drawings the various switches and relays are shown in so far as possible in their deenergized and dropped-out conditions.

Each set of the contacts associated with a relay or switch is identified by the reference character associated with the relay or switch followed by a numeral identifying the specific set of contacts. Thus, the reference characters U1, U2 and U3 designate, respectively, the first, second and third sets of contacts of the up switch U.

In order to facilitate the presentation of the invention, the apparatus shown in the figures will be briefly set forth, and the operation of the complete system thereafter will be discussed. The system includes in part the following apparatus:

*Apparatus specific to car A—Figs. 1–4*

V—speed relay
U—up switch
M—car-running relay
D—down switch
G—holding relay
E—slowdown inductor relay
F—stopping inductor relay
W—up-preference relay
X—down-preference relay
70T—timing relay
TT—car-call stopping relay
K—floor-call stopping relay
80—main starting relay
LL—car-position relay
N—loading relay
S—auxiliary starting relay
40—door relay
45—door-control relay
DC—door-close solenoid
DO—door-open solenoid
DH—door-hold relay
DT—door-hold-timing relay
SEB—safety-edge relay
SET—edge-timing relay
HS—signal-stop relay
PCR—photocell relay

*Apparatus common to all cars—Figs. 1–4*

2DR to 5DR—down floor-call storing relays
2UR to 4UR—up floor-call storing relays

Figure 1:
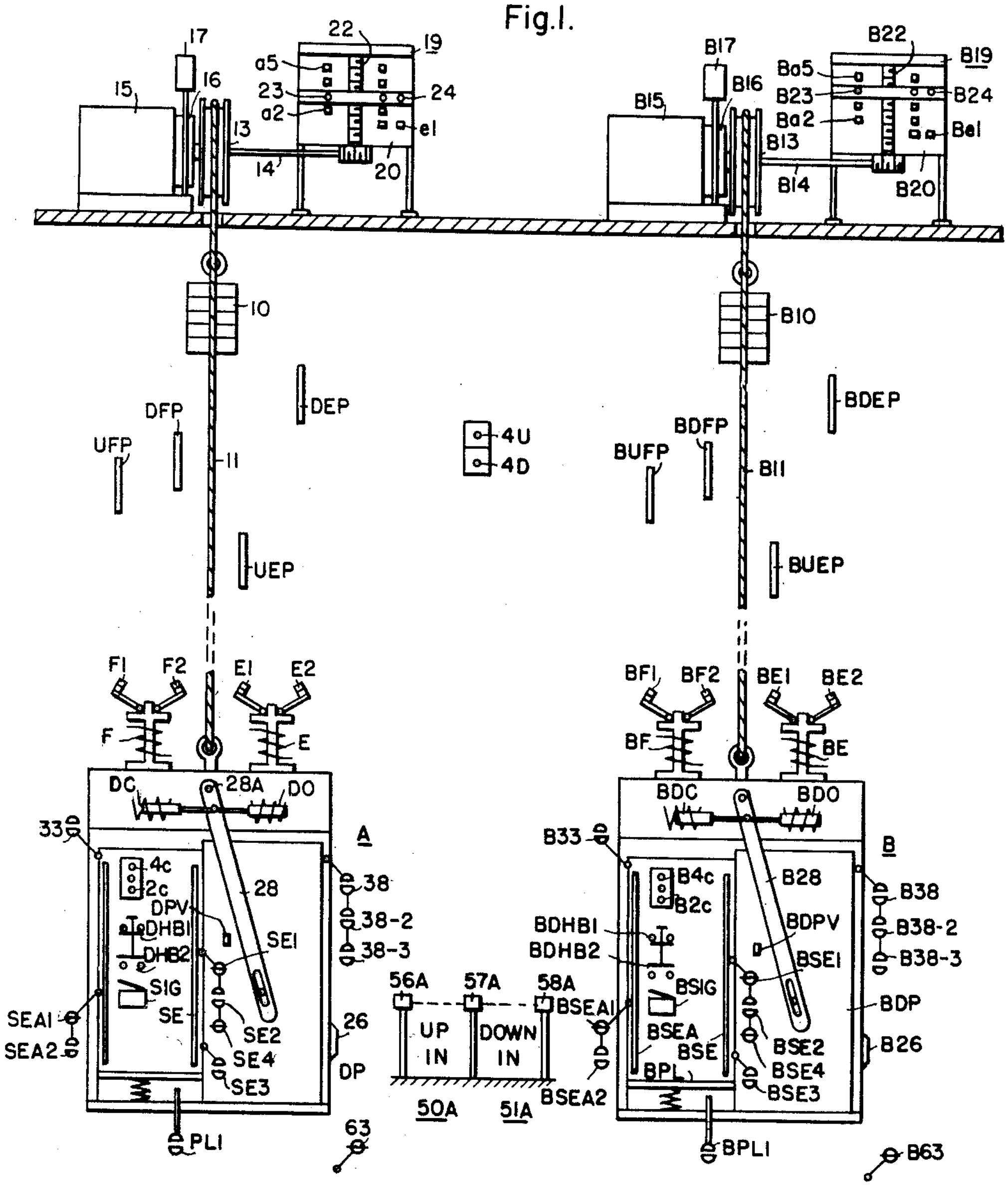
Figure 1 is a schematic view with parts in elevation and parts broken away of an elevator system which may embody the invention.

*Figure 1*

Fig. 1 illustrates the structural relationships of the elevator cars A, B and associated apparatus with reference to the building structure which the elevator cars are intended to serve.

The elevator car A and the counterweight 10 are secured to opposite ends of a rope or cable 11 which passes over a sheave 13. The sheave 13 is mounted on the shaft 14 of an elevator driving motor 15. The shaft 14 also carries a brake drum 16 with which a brake 17 of the conventional spring-applied electrically-released type is associated. The motor 15 is secured to the floor 18 of a penthouse located in the structure which the elevator car is intended to serve.

In order to simplify the association of control circuits with the elevator car A, a control device 19 is provided which is operated in accordance with a function of the movement of the elevator car A. In the specific embodiment of Fig. 1, the control device takes the form of a floor selector which includes an insulating panel 20 and a brush carriage 21. A screw 22 is mounted for rotation relative to the panel 20. This screw conveniently may be coupled through suitable gearing to the shaft 14 for rotation in accordance with movement of the elevator car A.

The brush carriage 21 is in threaded engagement with the screw 22. As the elevator car A moves upwardly, the brush carriage 21 is moved upwardly but at a rate much slower than the rate of movement of the elevator car. Similarly, when the elevator car A moves downwardly, the brush carriage 21 also moves downwardly at a slower rate.

The panel 20 carries a plurality of contact segments which are insulated from each other. Thus, the contact segments *a*2 to *a*5 are arranged in a row on the panel 20. As the elevator car proceeds upwardly from the first or lower terminal floor, a brush 23 mounted on the carriage 21 successively engages the contact segments *a*2 to *a*5, as the elevator car approaches respectively the floors 2 to 5 of the structure. It will be understood that the contact segments *a*2 to *a*5 are spaced from each other in accordance with the spacings of the floors. As will be pointed out below, these contact segments are associated with circuits controlling the stopping of the elevator car during up travel in response to car calls.

As a further example, the panel 20 has a single contact segment *e*1 which is engaged by a brush 24 mounted on the carriage 21 only when the elevator car A is adjacent the first or dispatching floor. As will be pointed out below, this contact segment is employed in controlling the operation of a dispatching device.

It will be understood that a number of rows of contact segments and a number of brushes may be employed in the floor selector. However, the foregoing discussion is believed sufficient to illustrate the mechanical relationships of these contact segments and brushes.

Certain apparatus is mounted on or in the elevator car A. Thus, car-call buttons 2*c* to 4*c* are provided for registering car calls for the second, third and fourth floors, respectively.

A slowdown inductor relay E is provided for the purpose of initiating a slowdown of the elevator car A as it approaches a floor at which it is to stop. The inductor relay may be of conventional construction and includes two sets of break contacts E1 and E2. When the coil of the inductor relay E is energized, the contacts remain in the positions illustrated in Fig. 1 until the relay is adjacent an inductor plate located in the hoistway of the elevator car A. For example, when the coil of the inductor relay E is energized and the inductor relay is adjacent the magnetic plate UEP for the second floor, the magnetic circuit is completed, which results in opening of the break contacts E1. When open, the contacts remain open until the coil of the inductor relay E is deenergized. The inductor plate UEP is positioned to be reached by the inductor relay E as the elevator car approaches the second floor for the purpose of initiating slowdown of the elevator car. It will be understood that a similar inductor plate is similarly associated with each of the floors at which the elevator car is required to stop during up travel.

If the coil of the inductor relay E is energized during down travel of the elevator car, and if the relay reaches the inductor plate DEP for the second floor, a magnetic circuit is completed which results in opening of the break contacts E2. When opened, the contacts remain open until the coil is deenergized. The inductor plate DEP is so positioned that it initiates slowdown of the elevator car A a suitable distance from the second floor. A similar inductor plate would be similarly associated with each of the floors at which the elevator car A is to stop during down travel.

The elevator car A also carries a stopping inductor relay F which is similar in construction to the inductor relay E. This relay is employed for initiating a stopping operation of the elevator car A. The stopping inductor relay F cooperates with inductor plates UFP and DFP in a manner which will be clear from the discussion of the cooperation of the slowdown inductor relay with the inductor plates UEP and DEP. If the coil of the relay F is energized and if the elevator car is to stop at the second floor while traveling up, when the inductor relay F reaches the inductor plate UFP a magnetic circuit is completed which results in opening of the break contacts F1. This initiates a stopping operation of the elevator car. An inductor plate similar to the plate UFP is similarly associated with each of the floors at which the elevator car A is to stop during up travel thereof. If the elevator car A during down travel is to stop at the second floor, the coil of the stopping inductor relay F is energized, and when the inductor relay reaches the inductor plate DFP for the second floor, a magnetic circuit is completed which results in opening of the contacts F2. This initiates a stopping operation of the elevator car A. It will be understood that an inductor plate similar to the inductor plate DFP is similarly associated with each of the floors at which the elevator A is to stop during down travel thereof.

The elevator car A also carries a cam 26 which is positioned to operate a mechanical switch 63 located in the hoistway associated with the elevator car. The mechanical switch 63 normally is closed and is opened by the can 26 when the elevator car A is adjacent the first or dispatching floor. It will be understood that other mechanical switches may be operated in a similar manner by the elevator car A.

An intending passenger on the fourth floor may register a floor call for elevator car service in the up direction by pushing a button of a push-button switch 4U. A similar push-button switch is located at each of the intermediate floors from which an intending passenger may desire to proceed in an up direction.

If the intending passenger at the fourth floor desires to proceed in a down direction, he may press the button of a push-button switch 4D located at the fourth floor. A similar push-button switch is located at each of the intermediate floors from which an intending passenger may desire to proceed in a down direction.

The elevator car A is provided with a door DP which is mounted to slide across the passage through which passengers enter and leave the elevator car. The door is moved by means of a lever 28 which is pivotally mounted on the car by means of a pivot 28A. The lever 28 is moved in a clockwise direction about the pivot by means of a door-close solenoid DC for the purpose of closing the passage and is moved in a counterclockwise movement about its pivot to open the door by means of a door-open solenoid DO. As hereinafter pointed out each of the solenoids may include not only an armature or magnetic core connected to the lever 28 but an armature or magnetic core for operating contacts.

It will be understood that a separate hoistway door DPH (illustrated in Fig. 1A for the elevator car A) is provided for each of the floors served by the elevator car. The coupling of the two doors may be effected in a conventional manner as by a vane DPV which is secured to the door DP for reception in the slot of a slotted block DPB which is mounted on the hoistway door DPH. The hoistway door DPH is moved to close and expose a hoistway passage through which load enters and leaves the elevator car.

Suitable mechanism is provided in the elevator car which may be operated to initiate a retarding of a closing movement of the elevator car door. For example, a door-hold button is provided which has two sets of contacts DHB1 and DHB2. These contacts are opened and closed respectively in response to operation of the door-hold button. The button is effective when operated for retarding or reopening a closing door.

In order to detect the presence of an object, such as a person in the closing path of the door, the door is provided with a safety edge SE which is mounted slightly in advance of the edge of the door which is the leading edge during door closure. The safety edge is biased to lead the door DP by a substantial distance, such as two inches. During a closing movement of the door if the safety edge SE engages a person standing in the closed path of the door, the safety edge is deflected to the right relative to the door DP, as viewed in Fig. 1, to operate switches SE1 and SE2. Further deflection of the safety edge results in operation of the contacts SE3.

If center opening doors were employed, a separate safety edge could be associated with each of the adjacent edges of the center opening doors. For present purposes, it will be assumed that a second safety edge SEA is mounted on the elevator car on the side of the door opening opposite that on which the safety edge SE is located. As viewed in Fig. 1, deflection of the safety edge SEA to the left relative to the car A results in operation of the contacts SEA1 and SEA2. The construction of safety edges is well known in the art.

As previously pointed out, a light beam also may be employed for protective purposes. To illustrate such a light beam, a lamp LAM (Fig. 1A) or suitable source of light is located to direct a beam of light BE across the door opening of the elevator car towards a photocell PC. The output of the photocell PC is suitably amplified for the purpose of operating a photocell relay PCR. The construction is such that the relay PCR is energized and picked up as long as the beam BE reaches the photocell PC. However, interruption of the beam is accompanied by dropout of relay PCR. Light ray mechanism of this general type is illustrated in the Kinnard Patent 1,822,152 and in the Ellis Patent 1,947,079.

Fig. 1 also illustrates mechanism for detecting the approach of a prospective passenger at a point displaced substantially from the elevator cars. To this end, two entrances 50A and 51A are provided, respectively, for prospective up passengers and prospective down passengers. The entrances are defined by standards 56A, 57A and 58A. The components 50A, 51A, 56A, 57A and 58A may be similar in construction and location to the components 50, 51, 56, 57 and 58 illustrated in the Williams et al. Patent 2,193,609.

A suitable load-responsive device is provided for controlling circuits in accordance with elevator car load. Thus, a spring-mounted platform PL closes a normally-open switch PL1 when the elevator car carries a substantial load such as 80% of rated capacity.

*Figure 2*

Fig. 2 shows circuits for the driving motor, the brake, the speed relay V, the up switch U, the down switch D, the car-running relay M, the holding relay G, the slowdown inductor relay E, the stopping inductor relay F, the up-preference relay W, the down-preference relay X, the timing relay 70T, the door relay 40, the door-control relay 45, the safety-edge relay SEB, the edge-timing relay SET, the door-close solenoid DC, and the door-open solenoid DO. Energy for the various circuits is derived from direct-current buses L+ and L−.

Although various motor control circuits may be employed, it will be assumed that a control circuit of the variable-voltage type is employed. By inspection of Fig. 2, it will be noted that the armature 15A of the driving motor 15 and the armature 29A of a direct-current generator 29, together with a series field winding 29B for the generator, are connected in a series or loop circuit. The field winding 15B for the driving motor 15 is connected directly across the buses L+ and L−.

The magnitude and direction of energization of the driving motor 15 are controlled by the direction and magnitude of the energization of a separately-excited field winding 29C provided for the generator 29. It will be understood that the armature 29A of the generator is rotated at a substantially constant rate by a suitable motor (not shown).

When the elevator car A is conditioned for up travel, the generator field winding 29C is connected across the buses L+, L− through make contacts U2 and U3 of the up switch. When the elevator car A is conditioned for down travel, the generator field winding 29C is connected across the buses through the make contacts D2 and D3 of the down switch. The energizing circuit for the field winding may include a resistor R1 which is shunted by make contacts V1 of the speed relay V. By inspection of Fig. 2, it will be observed that the contacts U2, U3, D2 and D3 constitute in effect a reversing switch for controlling the direction of energization of the field winding. The resistors R1 and the contacts V1 are provided for controlling the magnitude of energization of the field winding.

The speed relay V may be energized through either of two circuits. One of the circuits includes make contacts U4 of the up switch U, a limit switch 30 which is normally closed and which is opened as the elevator car A nears the upper limit of its travel and the break contacts E1 of the slowdown inductor relay E. The other circuit is completed through make contacts D4 of the down switch D, mechanical limit switch 31 which is normally closed and which is opened as the elevator car nears the lower limit of its travel in the down direction, and break contacts E2 of the slowdown inductor relay.

As previously pointed out, the brake 17 normally is spring-biased into engagement with the brake drum 16 and is released by energization of a brake coil 17B. The coil may be energized either through make contacts U1 of the up switch U or through make contacts D1 of the down switch D.

In order to energize the car-running relay M, certain safety devices 33 must be in their safe conditions. Such safety devices may include switches which are open when the doors of the elevator car and the associated hoistway doors are open, and which are closed when the doors are closed to control the door relay 40D. Such safety devices are well known in the art. The car-running relay M may be energized through either of the two circuits. One of the circuits includes the make contacts 80–1 of the starting relay 80, make contacts W1 of the up-preference relay W, break contacts F1 of the stopping-inductor relay, normally-closed contacts of a mechanical limit switch 34 which are opened when the car nears the upper limit of its travel, and the coil of the up switch U. When energized, the up switch U closes its make contacts U5 to complete a holding circuit around the contacts 80–1 and W1.

The second circuit for energizing the car-running relay M includes the contacts 80–1 of the starting relay, make contacts X1 of the down-preference relay X, break contacts F2 of the inductor stopping relay, normally-closed contacts of a mechanical limit switch 35 which are opened as the elevator car nears the lower limit of its travel in the down direction and the coil of the down switch D. When the down switch D is energized, makes contacts D5 are closed to provide a holding circuit around the contacts 80–1 and X1.

Under certain conditions the starting of the elevator car may be expedited by closure of the switch 81A and the make contacts L4 to shunt the contacts 80–1 of the main starting relay. These conditions will be discussed in connection with Fig. 7.

Before the holding relay G and the inductor relays E and F can be energized, make contacts M1 of the car-running relay must be closed. In addition, any one set of make contacts TT1 of the car-call stopping relay, and K1 of the floor-call stopping relay must be energized. A holding circuit around these contacts is established upon closure of the make contacts G1. Energization of the inductor stopping relay F further requires closure of the break contacts V2 of the speed relay.

The up-preference relay W is energized only if the elevator car is not operating in the down direction (break contacts D6 are closed); the elevator car is not conditioned for down travel (break contacts X2 are closed); and normally-closed contacts of a mechanical limit switch 36 are closed. The mechanical limit switch 36 is opened as the elevator car reaches its upper limit of travel.

Energization of the down-preference relay X requires closure of the break contacts U6 of the up switch, closure of the break contacts W2 of the up-preference relay, and closure of the normally-closed contacts of a mechanical limit switch 37. The mechanical limit switch 37 is open when the elevator car A is adjacent the first or dispatching floor.

The doors for the elevator car A are controlled by a door-control relay 45. For this relay to be initially energized, the break contacts N1 and TN1 must be closed to indicate that the elevator car is not being loaded at a terminal floor. The energizing circuit includes normally closed contacts SE1 and SEA1 which are operated by the safety edges and normally closed contacts DHB1 of the door-hold button. These contacts are shunted by make contacts HS1 of the signal-stop relay HS. In addition, the break contacts 70T1 must be closed to indicate that the non-interference time has expired. When the relay 45 picks up, it closes make contacts 45-1 to partially complete with the make contacts M2 of the running relay M a holding circuit for the relay. If a manual switch 81 is closed, a partial holding circuit also may be completed through the make contacts CO1 of a relay to be discussed in connection with Fig. 7. The energizing circuit for the relay 45 also includes a manually-operated switch 82 which is assumed to be closed. If the switch is open, contacts CDR1 also control the energization of the relay 45 and this condition will be discussed in connection with Fig. 8.

The door-control relay 45 controls the energization of the door-close solenoid DC and the door-open solenoid DO. If the contacts 45-2 of the door-control relay, the break contacts HS2 of the signal-stop relay HS and the break contacts 40D-2 are all closed, the solenoid DC is energized. The contacts 40D-2 are closed when the door of the elevator car A or an associated hoistway door is away from its closed condition. Opening of the contacts HS2 introduces a resistor R3 in the circuit to decrease the force exerted by the solenoid DC.

If the door-control relay 45 is dropped out, the make contacts 45-3 are closed to complete with the switch 38 an energizing circuit for the door-open solenoid DO. The switch 38 is a limit switch which is normally closed and which is opened as the door reaches its fully-open position.

Operation of the door-hold button closes normally open contacts DHB2 to connect the door-hold relay DH across the buses L+ and L—. In some cases, it may be desirable to close the manually operated switch 83 to establish a holding circuit through the break contacts M6 of the car-running relay M and make contacts DH1 of the door-hold relay.

Energization of the door-hold relay DH results in opening of the break contacts DH2 to start a timing-out operation of the door-hold-timing relay DT. This relay DT has a substantial delay in dropout which may be, for example, of the order of 6 seconds.

Closure of the normally open contacts SE2 or SEA2, respectively, by operation of the associated safety edges results in energization of the safety edge relay SEB. Under some conditions, it may be desirable to provide a hold circuit for the relay SEB by closure of the manually operable switch 85 which establishes a holding circuit through break contacts M7 of the car-running relay M and make contacts SEB1 of the safety edge relay SEB.

Energization of the relay SEB results in opening of the break contacts SEB2 to start a timing-out operation of the edge-timing relay SET. This relay has a substantial time delay in dropout which, for example, may be of the order of 3 seconds.

The timing relay 70T is connected for energization by make contacts M5 of the car-running relay or by make contacts DO-2 of the door-open solenoid. It will be noted that a resistor R3 is connected across the timing relay 70T. If the timing relay is energized and the contacts M5 and DO2 both thereafter open, the stored energy in the relay 70T discharges through the resistor to delay the dropout of the timing relay 70T for a suitable non-interference time, such as 3 seconds. This is a conventional time-delay relay construction, but other constructions may be employed, if so desired.

Energization of the windings or solenoids DC and DO may be employed not only for opening and closing the doors but for operating relay contacts. For present purposes it will be assumed that each of the windings operates two magnetic armatures or plungers. When one of the windings is energized one of its plungers picks up to move the door and its second plunger picks up to operate any desire contacts.

*Figure 3*

Fig. 3 illustrates circuits for energizing the signal-stop relay HS, the car-call stopping relay TT, the floor-call stopping relay K and the main starting relay 80.

If it is desired to indicate that a safety edge is being operated, the manually operable switch 86 may be closed to connect a plurality of lamps 86A across the buses L+ and L— through make contacts SEB3 and BSEB3 which are connected in parallel. Thus, if the safety edge of any of the elevator cars in the system is operated, the lamps are connected across the buses. One of the lamps conveniently may be located at each of the floors adjacent the floor push buttons. If desired, the lamp may include a sign which indicates to prospective passengers that the safety edge of one of the elevator cars is being held. For present purposes, it will be assumed that the switch 86 is open.

A suitable signal SIG is provided in the elevator car A to warn passengers that the door is being prevented from closing for an undue period of time. The signal may be a voice signal which when operated conveys such a message to the passengers within the elevator car. For present purposes, it will be assumed that the signal SIG is a buzzer.

Assuming that the switch 87 is closed, operation of the signal requires one of two conditions to be satisfied. If one of the safety edges has been operated for at least a predetermined time, such as 3 seconds, break contacts SET1 close to complete with the switch 87 and the break contacts HS3 an energizing circuit for the signal SIG. If the door is closing at the time the break contacts SET1 close, the break contacts DO3 also are closed, and the make contacts SEB4 are closed to indicate that the safety edge is being held. Consequently, an energizing circuit for the signal under these conditions also is established as follows:

L+, SET1, 87, SIG, SEB4, DO3, L—

At the same time, the signal stop relay HS is energized through the closed break contacts M8 of the car-running relay to close its self-holding make contacts HS4 and to open its break contacts HS3.

The energization of the signal SIG also may be effected if the door-hold button is operated for a sufficiently long time, such as 6 seconds, to close the break contacts DT1. Such closure establishes with the switch 87 and the break contacts HS3 an energizing circuit for the signal SIG and also establishes with the break contacts M8 an energizing circuit for the signal stop relay HS.

At the time the break contacts DT1 close, the door-hold button is being operated and the make contacts DH3 are closed. If the elevator car door is closing at such time, the break contacts DO3 are closed and the following circuit is completed:

L+, DT1, 87, SIG, DH3, DO3, L−

If it is dsired to operate the signal SIG only during the presence of a predetermined service demand, the switch 87 may be opened. The opening of the switch 87 requires the presence of one of two additional conditions before the signal SIG can be operated. If at least a predetermined number of floor calls are registered, the make contacts QH1 are closed to satisfy one of these two conditions.

If the rate at which floor calls are being registered exceeds a certain value, the make contact TH1 close to satisfy the second of the two conditions. Circuits for operating the contacts TH1 and QH1 will be considered in connection with Fig. 7.

The car-call push buttons 2*c* to 4*c* normally are biased into their open positions. Each of the push buttons is provided with a holding coil 2*cc* to 4*cc*, which is effective for holding the associated push button in its operated condition following a manual operation of such push button. To this end, the push buttons may be made of magnetic material. Such construction of the push buttons is well known in the art.

Each of the push buttons 2*c* to 4*c* controls the connection of contact segments to the bus L+. Thus, when operated, the push button 2*c* connects the contact segment *h*1 to the bus L+. When operated, the push button 2*c* connects the contact segments *a*2 and *h*2 to the bus L+. The push buttons 3*c* and 4*c* similarly connect contact segments for the third and fourth floors to the bus L+. Inasmuch as the elevator car is assumed to stop at the fifth floor or upper terminal floor at all times during up travel, the contact segment *a*5 is permanently connected to the bus L+. Inasmuch as the elevator car is assumed to stop at the fifth floor or upper terminal floor at all times during up travel, the contact segment *a*5 is permanently connected to the bus L+. Similarly, during down travel, the elevator car A always stops when it reaches the first floor, and the contact segment *h*1 for the first floor is permanently connected to the bus L+.

It will be understood that the contact segments *a*2 to *a*5 are arranged in a row on the floor selector 19 of Fig. 1 and are successively engaged by a brush 23 as the elevator car moves from its lower limit to its upper limit of travel. In a similar manner, the contact segments *h*4 to *h*1 are arranged in a row in the order of the floors for successive engagement by a brush 40 as the elevator car moves from the upper terminal to its lower limit of travel.

During up travel of the elevator car A, the car-call stopping relay TT is connected between the brush 23 and the bus L− through make contacts W3 of the up-preference relay and make contacts M3 of the car-running relay. Consequently, when the brush 23 reaches one of the contact segments *a*2 to *a*5 which is connected to the bus L+, the car-call stopping relay TT is connected for energization across the buses L+ and L− for the purpose of stopping the elevator car at the next floor reached by the car. As the elevator car stops, the brush 23 preferably passes slightly beyond the associated contact segment.

When the elevator car A is conditioned for down travel, the car-call stopping relay TT is connected between the brush 40 and the bus L− through the make contacts X3 of the down-preference relay and the make contacts M3 of the car-running relay. Consequently, when the brush 40 reaches one of the contact segments *h*4 to *h*1 which is connected to the bus L+, the car-call stopping relay TT is energized to initiate a stopping operation of the elevator car at the next floor reached by the car. As the elevator car stops, the brush 40 preferably passes slightly beyond the associated contact segment.

The coils 2*cc* to 4*cc* are connected in series for energization either through make contacts W4 of the up-preference relay or make contacts X4 of the down-preference relay. When the elevator car reverses its direction of travel, the make contacts W4 and X4 both are momentarily opened to deenergize the associated holding coils for the purpose of resetting the car-call push buttons.

When the down floor-call push button 2D is operated, the down floor-call storing relay 2DR is connected therethrough across the buses L+ and L− for energization. Upon energization, the relay closes its make contacts 2DR1 to establish a holding circuit around the push button. The contact segment *f*2 now is connected (and corresponding contact segments for the remaining elevator cars are connected) through the contacts 2DR1 to the bus L+. The contact segments *f*4 and *f*3 similarly are connected to the bus L+ by operation of the down floor-call push buttons 4D and 3D. The contact segments *f*4, *f*3 and *f*2 for the fourth, third, and second floors are positioned in a row on the floor selector 19 of Fig. 1 for successive engagement by a brush 58 as the elevator car A moves from the upper terminal in a down direction.

The floor-call stopping relay K is connected between the bus L+ and the brush 58 through make contacts X5 of the down-preference relay. Consequently, if the elevator car A approaches the second floor during a down trip while a down floor call is registered for such floor, the engagement of the contact segment *f*2 by the brush 58 completes an energizing circuit for the floor-call stopping relay K.

Each of the down floor-call storing relays 4DR, 3DR and 2DR has an operating coil and a cancelling coil, respectively, 4DRN, 3DRN and 2DRN which is energized in opposition to the energization of the operating coil. The cancelling coil 2DRN is connected between a contact segment *g*2 (and similar contact segments B*g*2 etc. for the other elevator cars) and the bus L+ through the make contacts 2DR1. As the elevator car A reaches the second floor, the following energizing circuit for the cancelling coil is established:

L+, 2DR1, 2DRN, *g*2, 59, X6, M4, L−

Energization of the coil 2DRN opposes energization of the relay by the operating coil and resets the relay. It will be understood that the contact segments *g*4, *g*3 and *g*2 are arranged in a row for successive engagement by the brush 59 as the elevator car proceeds downwardly from the upper terminal floor to control the energization of the cancelling coils 4DRN, 3DRN and 2DRN.

The down floor-call storing relays all cooperate with the brushes 58 and 59 in substantially the same manner to control the energization of the floor-call stopping relay during down travel of the elevator car.

When the up floor-call push button 2U is operated, the up floor-call storing relay 2UR is connected for energization therethrough across the buses L+ and L−. Upon operation, the relay closes its make contacts 2UR1 to establish a holding circuit around the push button 2U. As a result, a contact segment *b*2 is connected (and contact segments B*b*2 etc. for the other elevator cars are connected) to the bus L+ through such make contacts.

As the elevator car during up travel approaches the second floor, the brush 60 engages the contact segment *b*2 to establish the following energizing circuit for the floor-call stopping relay:

L+, 2UR1, *b*2, 60, W5, K, L−

This conditions the elevator to stop at the second floor. As the elevator car stops at the second floor, a brush 61 engages the contact segment $c2$ to establish the following circuit for the cancelling coil of the storing relay 2UR:

L+, 2UR1, 2URN, $c2$, 61, W6, M4, L−

Such energization of the cancelling coil results in resetting of the storing relay which has its main coil acting in opposition to the cancelling coil. The up floor-call push buttons 3U and 4U similarly control the associated storing relays and contact segments. It will be understood that the contact segments $c2$, $c3$ and $c4$, and contact segments $b2$, $b3$ and $b4$ are arranged in rows on the floor selector for engagement successively by the brushes 61 and 60, as the elevator car A proceeds upwardly.

The starting relay 80 can be energized only if the timing relay 70T is deenergized and dropped out to close its break contacts 70T2. When the elevator car is positioned at the lower dispatching floor, the energizing circuit for the starting relay normally is completed through the make contacts S1 of an auxiliary starting relay. At the upper terminal or dispatching floor, make contacts TS1 may operate in a manner similar to the operation of the contacts S1 for the lower dispatching floor to start the elevator car from the upper terminal floor. Between the dispatching floors, the make contacts S1 are shunted by the contacts of a mechanical switch 63. This switch is cam operated to open when the elevator car is adjacent the upper terminal or dispatching floor and the lower dispatching floor. For all other positions of the elevator car A, the switch 63 is closed.

If dispatchers at the terminal floors are not required, a switch 63A may be manually closed to shunt the switch 63.

*Figure 4*

In Fig. 4, a dispatching device is illustrated which normally controls the lower terminal dispatching of the elevator cars employed in the system.

The selection and timing mechanism include as one component a motor 71 which operates substantially at constant speed. This motor may be of any suitable type, but for present purposes it will be assumed that the motor is a squirrel-cage alternating-current motor which is energized from a suitable source of alternating-current. The motor 71 is connected through a spring-released electromagnetically-applied clutch 72 to a cam 73 having a protuberance for successively operating mechanical switches Y, BY, CY and DY which are associated with the respective elevator cars. The electromagnetic clutch can be energized only if one or more elevator cars are located at the dispatching floor which is assumed to be the first floor (one or more of the contacts LL1, BLL1, CLL1, DLL1 are closed), and if no elevator car has been selected as the next car to leave the dispatching floor (break contacts N2, BN2, CN2 and DN2 all are closed).

The motor 71 also may be coupled through a spring-released electromagnetically-applied clutch 74 to a cam 75 which is biased towards a predetermined position by a spring 76. The cam 75, when coupled to the motor 71, is rotated against the bias of the spring to close normally-open contacts 77 a predetermined time after the cam 75 is coupled to the motor 71. The clutch 74 can be electrically energized only if no elevator car is being started (break contacts S2, BS2, CS2 and DS2 are closed), and if the break contacts 1S1 of the holding relay 1S are closed. The holding relay 1S is energized upon closure of the contacts 77 to close its make contacts 1S2 for the purpose of establishing a holding circuit around the contacts 77.

The presence of an elevator car at the dispatching floor is determined by the energization of a car-position relay for each of the elevator cars. Thus, a car-position relay LL for the elevator car A is energized when the brush 24 engages the contact segment $e1$.

The brush 24 is operated by the floor selector for the elevator car A to engage the contact segment $e1$ when the elevator car is at the dispatching floor.

If the elevator car A is at the dispatching floor (make contacts LL2 are closed), if it has been selected as the next car to leave the dispatching floor (switch Y is closed), and if it is not being started (break contacts S3 are closed), the loading relay N for the elevator car A is energized. The loading relay may be employed in a conventional way to permit loading of the elevator car A. For example, the loading relay when energized may operate a loading signal, such as a lamp, which indicates that pasengers may enter the elevator car. Conveniently, the loading relay N when energized opens the normally-closed doors of the elevator car A to permit entry of passengers into the elevator car.

After the expiration of a time sufficient for cam 75 to close the contacts 77 and energize the relay 1S, the make contacts 1S3 close to complete the following circuit:

L+, LL2, S, N3, 1S3, L−

The relay S when energized closes its make contacts S4 to establish a holding circuit around the contacts N3 and 1S3, and starts the elevator car A from the dispatching floor.

*Operation—Figs. 1–4*

In order to explain the over-all operation of the elevator system illustrated in Figs. 1–4, it will be assumed first that the elevator cars are at the first or dispatching floor when the system initially is energized. The cars are conditioned for operation in the up direction. For example, the elevator car A has its up-preference relay W energized. Consequently, make contacts W1, W3, W4, W5, W6 of the relay are closed, whereas break contacts W2 of the relay are open. Switches 81, 83, 85 (Fig. 2) are assumed to be open, and switches 82 (Fig. 2) and 87 (Fig. 3) are assumed to be closed.

The switch 63A (Fig. 3) is assumed to be open. Since the cars are at the first floor, the switch 63 is open. The timing delay 70T (Fig. 2) is assumed to have timed out. The relays 45 and 40 are picked up and the elevator car doors are closed.

The motor 71 (Fig. 4) is energized to rotate at a substantially constant rate.

Inasmuch as the elevator cars are assumed to be at the dispatching floor, the car-position relays LL, etc. are energized.

As a result of its energization, the car-position relay LL closes its make contacts LL2 to prepare certain circuits for subsequent energization. In addition, the make contacts LL1 close to complete the following circuit for the clutch 72:

L+, LL1, 72, N2, BN2, CN2, DN2, L−

The clutch now couples the motor 71 to the cam 73 for the purpose of successively closing and opening the associated mechanical switches. It will be assumed that the first switch reached by the cam is the switch Y for the elevator car A. Closure of this switch completes the following energizing circuit for the loading relay of the elevator car A:

L+, LL2, N, S3, Y, L−

The loading relay N upon energization initiates opening of normally-closed doors of the elevator car A to permit intending passengers on the dispatching floor to enter the elevator car. Such opening is effected by opening of contacts N1 (Fig. 2) to deenergize the door-control relay 45. This relay opens its contacts 45–1 and 45–2 without immediate effect on system operation. However, closure of contacts 45–3 energizes the solenoid DO to open the doors. The solenoid DO also closes its contacts DO1 to establish a self-holding circuit around its contacts DO2 to energize the timing relay 70T, and the relay 70T opens its break contacts 70T1 and 70T2 (Fig. 3) without immediate effect on the systems.

In opening, the door opens its set of contacts 33 to deenergize the door relay 40D which opens its contacts 40D1 and closes its contacts 40D2 without immediate effect on system operation. When it reaches open position, the door opens limit switch 38 to deenergize the solenoid DO. The solenoid DO opens its contacts DO1 without immediate system effect and opens contacts DO2 to initiate a timing out operation of the timing relay 70T.

Opening of the break contacts N2 (Fig. 4) deenergizes the clutch 72. Consequently, the cam 73 is uncoupled from the motor 71. Finally, the make contacts N3 close to prepare the starting relay S for subsequent energization.

Upon expiration of its timing period the relay 70T drops out to close its break contacts 70T1 and 70T2. Such closures prepare circuits for subsequent operation.

When the system was placed in operation, the clutch 74 was energized through the circuit:

L+, 1S1, 74, S2, BS2, CS2, DS2, L−

As a result of its coupling to the motor 71, the cam 75 rotates against the bias of its spring 76 until at the expiration of the time interval allowed for loading elevator cars the contacts 77 close. Closure of these contacts completes the following circuit:

L+, 1S, 77, S2, BS2, CS2, DS2, L−

The energized relay 1S closes its make contacts 1S2 to establish a holding circuit around the contacts 77. The break contacts 1S1 open to deenergize the clutch 74, and the spring 76 now rotates the cam to its starting position. Also, the make contacts 1S3 close to energize the auxiliary starting relay S through the following circuit:

L+, LL2, S, N3, 1S3, L−

Energization of the auxiliary starting relay S closes the make contacts S4 to establish a holding circuit around the contacts N3 and 1S3. Break contacts S3 open to deenergize the loading relay N. Break contacts S2 open, and this opening causes relay 1S to drop out. This has no immediate effect on the system operation.

The loading relay when deenergized opens its make contacts N3 without immediate effect on the operation of the system. In addition, break contacts N2 close to prepare the clutch 72 for subsequent energization.

The deenergization of the loading relay further closes break contacts N1 (Fig. 2) to complete the following energizing circuit for the door-control relay 45:

L+, 70T1, SE1, SEA1, DHB1, 45, TN1, N1, 82, L−

The relay 45 closes its make contacts 45–1 and opens its break contacts 45–3 without immediate effect on system operation. However, closure of make contacts 45–2 completes with the contacts 40–2 and HS2 an energizing circuit for the door-close solenoid DC, and the door now starts to close.

Upon closing, the door closes its switch 33 to complete an energizing circuit for the door relay 40D which closes its make contacts 40D1 and opens its break contacts 40D2 to deenergize the door-close solenoid DC.

Turning now to Fig. 3, it will be noted that closure of the make contacts S1 results from energization of the auxiliary starting relay S. Inasmuch as the elevator car A is assumed to have remained at the dispatching floor for a time sufficient to permit closure of the break contacts 70T2, an energizing circuit now is complete for the main starting relay 80.

The previously mentioned closure of contacts 40D1 of the door relay (Fig. 2) coupled with closure of the make contacts 80–1 of the starting relay completes the following circuit for the up switch and the car-running relay:

L+, 80–1, W1, F1, 34, U, M, 40D1, L−

The energized up switch U closes its make contact U1 to release the brake 17, and contacts U2 and U3 close to energize the generator field winding 29C with proper polarity for up travel of the elevator car. Make contacts U4 close to complete through the limit switch 30 and the contacts E1 an energizing circuit for the speed relay V. The speed relay closes its make contact V1 to shunt the resistor R1 and condition the elevator car A for full speed operation in the up direction. Also, the speed relay opens its break contacts V2 to prevent energization therethrough of the stopping inductor relay F.

Returning to the up switch U, it will be noted that closure of the make contacts U5 establishes a holding circuit around the contacts 80–1 and W1. Opening of the break contacts U6 prevents energization therethrough of the down preference relay. The elevator car A now is in condition for full speed operation in the up direction and departs from the dispatching floor.

It will be recalled that the car-running relay M was energized with the up switch U. The car-running relay closed its make contacts M1, M3 and M4 (Fig. 3) and opened its break contacts M6, M7 and M8 without immediate effect on the operation of the system. However, closure of the make contacts M2 (Fig. 2) completes with the contacts 45–1, TN1 and N1 a holding circuit for the door-control relay 45. Closure of the make contacts M5 energizes the timing relay 70T. This relay opens its break contacts 70T2 (Fig. 3) which causes the starting relay 80 to become deenergized. Opening of break contacts 70T1 (Fig. 2) does not immediately effect system operation.

It will be assumed now that the passenger in the elevator car operates the car-call push button *3c* (Fig. 2) to register a car call for the third floor. Such operation connects the contact segments *a3* and *h3* to the bus L+. As the elevator car nears the third floor, the brush 23 engages the contact segment *a3* to complete the following circuit for the car-call stopping relay TT:

L+, *3c*, *a3*, 23, W3, TT, M3, L−

The car-call stopping relay now closes its make contacts TT1 (Fig. 2) to energize the holding relay G and the slowdown inductor relay E through the closed contacts M1. Energization of the holding relay G completes through the make contacts G1 a holding circuit around the contacts TT1.

When the elevator car A in its upward travel reaches the inductor plate UEP (Fig. 1) for the third floor, the break contacts E1 are opened to deenergize the speed relay V (Fig. 2). The speed relay opens its break contacts V1 to introduce the resistor R1 in series with the generator field winding 29C. The resultant reduction in field current slows the elevator car to a landing speed. In addition, the speed relay V closes its break contacts V2 to complete through the contacts G1 and M1 an energizing circuit for the stopping inductor relay F.

Shortly before the elevator car A in its continued upward movement at the landing speed reaches the third floor, the inductor plate UFP for the third floor is adjacent the stopping inductor relay and completes a magnetic circuit while results in opening of the contacts F1. Opening of the contacts F1 (Fig. 2) deenergizes the up switch U and the car-running relay M.

The up switch U opens its make contacts U1 to deenergize the brake 17, and the brake is promptly forced against the brake drum 16 by its associated spring. Contacts U2 and U3 open to deenergize the generator field winding 29C. Consequently, the elevator car A stops accurately at the third floor. Opening of the make contacts U4 and U5 and closure of the break contacts U6 have no immediate effect on the operation of the system. As the elevator car comes to a stop brush 23 may pass the contact segment for a slight distance to deenergize the relay TT.

The previously-mentioned deenergization of the car-running relay resulted in opening of the make contacts M1 to deenergize the inductor relays E and F and the holding relay G. The holding relay G opened its make contacts G1 without immediately affecting the operation of the system.

The car-running relay also opened its make contacts M5 to start a timing-out operation of the timing relay 70T. This relay has a time delay in drop out sufficient to permit discharge of passengers or entry of passengers into the elevator car A. For example, a time delay of three seconds may be employed. Opening of the make contacts M3 and closure of the break contacts M4, M6, M7, M8 have no immediate effect on the operation of the system.

Opening of make contacts M2 deenergizes the door control relay 45 and this relay opens its make contacts 45–1 and 45–2 without immediate effect on system operation. However, closure of break contacts 45–3 completes with the switch 38 a circuit for the door-open solenoid DO and the door now opens. Self-holding contacts DO1 close. The solenoid DO also closes its contacts DO2 to reenergize the timing relay 70T. However, when the door reaches its open position the switch 38 opens to deenergize the solenoid DO, the self-holding contacts DO1 open and the contacts DO2 open to permit the timing relay to time out. In opening, the door opens its switch 33 to deenergize the door relay 40D without immediate effect on system operation.

Let it be assumed that instead of a car call, an up floor call was registered for the third floor by operation of the push button 3U (Fig. 3). Such operation energizes the up floor call storing relay 3UR which closes its make contacts 3UR1 to establish a holding circuit around the push button. The contacts 3UR1 also serve to connect the contact segment *b*3 and corresponding contact segments for the remaining elevator cars of the system to the bus L+.

As the elevator car approaches the third floor, the brush 60 engages the contact segment *b*3 to energize the floor-call stopping relay K through the following circuit:

L+, 3UR1, *b*3, 60, W5, K, L−

Upon energization, the floor call stopping relay closes its make contacts K1 (Fig. 2) to energize through the contacts M1 the holding relay G and the slowdown inductor relay E. These relays operate in the same manner previously discussed to stop the elevator car accurately at the third floor.

As the elevator car A slows down to stop at the third floor, the brush 61 engages the contact segment *c*3 to complete the following cancelling circuit:

L+, 3UR1, 3URN, *c*3, 61, W6, M4, L−

It will be recalled that the break contacts M4 close as the elevator car stops at the third floor. As a result of its energization, the cancelling coil 3URN resets the up floor-call storing relay for the third floor.

Referring to Fig. 3, it will be recalled that the mechanical switch 63 is closed only at the lower dispatching-floor and the upper-terminal-floor positions of the elevator car. Since the elevator car is now at the third floor, the switch 63 is closed. Consequently, as soon as the timing relay 70T drops out, the break contacts 70T2 close to complete an energizing circuit for the starting relay 80. This operates in the manner previously discussed to start the elevator car upwardly. In this way, the elevator car A continues to the upper terminal floor, answering all registered car calls and all registered up floor calls during its upward trip.

As the elevator car A approaches the upper terminal or fifth floor, the brush 23 (Fig. 2) engages the contact segment *a*5 to complete the following energizing circuit for the car-call stopping relay:

L+, *a*5, 23, W3, TT, M3, L−

The car-call stopping relay operates in the manner previously discussed to stop the elevator car accurately at the upper-terminal floor.

As the elevator car A reaches the upper-terminal floor, the mechanical switch 63 (Fig. 3) opens. Consequently, the elevator car A cannot start from the upper-terminal floor until it is started by its upper-terminal dispatching device represented by the contacts TS1. It will be understood that the upper-terminal dispatching device may be similar to the dispatching device discussed for the first floor. For present purposes it will be assumed that the contacts TS1 operate for the upper-terminal dispatching floor in the same maner by which the contacts S1 operate for the lower dispatching floor.

As the elevator car reaches the fifth floor, the limit switch 36 (Fig. 2) opens to deenergize the up-preference relay W. This relay opens its make contacts W1, W3, W5, W6, without immediately affecting the operation of the system. However, opening of the make contacts W4 deenergizes the holding coils for the car-call push buttons, and these are reset. In addition, closing of the break contacts W2 completes the following energizing circuit for the down-preference relay:

L+, U6, W2, X, 37, L−

The down-preference relay X closes its make contacts X1, X3, X4, X5 and X6 and opens it break contacts X2 to condition the elevator car for down travel.

It will be assumed next that the dispatching device for the upper terminal floor closes its contacts TS1 (Fig. 3) and that the timing relay has closed its break contacts 70T1 to complete an energizing circuit for the starting relay 80. The loading relay of the dispatching device for the upper-terminal floor operates the contacts TN1 to control the door-control relay 45 in the same manner by which contacts N1 control the door-control relay at the lower terminal floor. The closing of the doors coupled with the closing of the make contacts 80–1 completes the following circuit for the down switch D and the car-running relay M:

L+, 80–1, X1, F2, 35, D, M, 40–1, L−

The car-running relay M operates in the manner previously described to prepare certain circuits for subsequent operation.

Upon energization, the down switch D closes its make contacts D1 to release the brake 17. In addition, make contacts D2 and D3 close to energize the generator field winding 29C in the proper direction for down travel of the elevator car. Closure of the make contacts D4 completes an energizing circuit for the speed relay V. This relay closes its make contacts VI to shunt the resistor R1 and opens it break contacts V2. The elevator car now is conditioned for movement in the down direction at full speed and moves away from the upper terminal floor.

Closure of make contacts D5 establishes a holding circuit around the contacts 80–1 and X1. Opening of break contacts D6 has no immediate effect on the operation of the system.

It will be understood that as the elevator car leaves the upper terminal floor, the limit switch 35 (Fig. 2) and the switch 63 (Fig. 3) reclose.

It will be assumed next that a passenger in the elevator car operates the car-call push button 3*c* for the purpose of registering a car call for the third floor. This button connects the contact segments *a*3 and *h*3 to the bus L +.

When the brush 40 reaches the contact segment *h*3, an energizing circuit is established for the car-call stopping relay TT as follows:

L+, 3*c*, *h*3, 40, X3, TT, M3, L−

Consequently, the relay closes its make contacts TT1 to energize through the contacts M1 the holding relay G and the inductor relay E. The holding relay G closes its make contacts G1 to establish a holding circuit around the contacts TT1.

When the slowdown inductor relay E reaches the inductor plate DEP for the third floor (Fig. 1), the contacts E2 open to deenergize the speed relay V (Fig. 2). The speed relay opens its make contacts VI to introduce the resistor R1 in series with the generator field winding 29C. The elevator car now slows to a landing speed. In addition, the break contacts V2 close to complete an energizing circuit for the stopping inductor relay F.

When the stopping inductor relay F reaches the inductor plate DFP for the third floor, the contacts F2 open to deenergize the down switch D and the car-running relay M. The down switch D opens its make contacts D1 to permit reapplication of the brake 17. Make contacts D2 and D3 open to deenergize the generator field winding, and the elevator car A stops accurately at the third floor. Opening of the make contacts D4 and D5 and closing of the break contacts D6 have no immediate effect on the operation of the system. As the elevator car comes to a stop the brush 40 may pass the contact segment $h3$ slightly to deenergize the relay TT.

The car-running relay M opens its make contacts M1 to deenergize the inductor relays and the holding relay G. The holding relay G in turn opens its make contacts G1 to prevent subsequent energization therethrough of the inductor relays.

The make contacts M2 open to initiate an opening operation of the doors. The opening and closing of the doors will be understood from the previous discussion thereof.

The car-running relay M also opens its make contacts M5 and this is followed by opening of the contacts DO–1 to start a timing-out operation of the timing relay 70T. Opening of make contacts M3 and M5 and closing of break contacts M4, M6, M7 and M8 have no immediate effect on the operation of the system. When the timing relay 70T drops out, the break contacts 70T2 (Fig. 3) close to energize through the switch 63 the starting relay 80. The starting relay operates in the manner previously described to start the elevator car down from the third floor.

Let it be assumed that instead of a car call a down floor call was registered for the third floor by operation of the push button 3D (Fig. 3). Such operation energizes the down floor-call storing relay 3DR which closes its make contact 3DR1 to establish a holding circuit around the push button 3D. The contact segment $f3$ and corresponding contact segments for the remaining elevator cars of the system are connected through the make contacts 3DR1 to the bus L+.

As the elevator car A approaches the third floor in the down direction, the brush 58 reaches the contact segment $f3$ to complete an energizing circuit for the floor call stopping relay K as follows:

L+, 3DR1, $f3$, 58, X5, K, L−

The relay K closes its make contacts K1 (Fig. 2) to energize the holding relay G and the slowdown inductor relay E through the contacts M1. These relays operate in the manner previously described to stop the down traveling elevator car at the third floor.

During the stopping operation, the following cancelling circuit (Fig. 3) is established:

L+, 3DR1, 3DRN, $g3$, 59, X6, M4, L−

As a result of energization of the cancelling coil 3DRN, the down floor call storing relay 3DR is reset.

When the elevator car in its down travel nears the first or dispatching floor, the brush 40 (Fig. 2) engages the contact segment $h1$ to complete the following circuit.

L+, $h1$, 40, X3, TT, M3, L−

The energization of the car-call stopping relay TT stops the elevator car at the first floor in the same manner discussed with reference to the stopping of the elevator car at the third floor.

As the elevator car A stops at the first floor, the mechanical switch 37 opens to deenergize the down-preference relay X. This relay opens its make contacts X1, X3, X5 and X6 without immediately affecting the operation of the system. However, closure of the break contacts X2 completes an energizing circuit for the up preference relay W. This operates in the manner previously discussed to condition the elevator car for up travel.

It will be noted that as the relay X is deenergized the make contacts X4 and W4 are open until the up-preference relay W is again energized. During this momentary opening of both sets of contacts, the holding coils for the car-call push button are deenergized to reset the buttons.

The effect of operation of the safety edges and of the door-hold button on the elevator system will now be considered. It will be assumed that the switches 81, 83 and 85 are open and that the switches 86 and 87 (Fig. 3) are closed. Let it be assumed first that as a door starts to close in the manner previously described a person engages the safety edge SE to open the contacts SE1 and to close the contacts SE2. As a result of the opening of the contacts SE1, the energizing circuit for the door control relay 45 is interrupted and this relay drops out. The resultant opening of the make contacts 45–1 does not affect the immediate operation of the system. Opening of the make contacts 45–2 interrupts the energizing circuit for the door close solenoid DC, and the door consequently stops. Closure of the break contacts 45–3 completes an energizing circuit for the door-open solenoid DO, and this initiates an opening operation of the door in the manner previously described.

Closure of the contacts SE2 by the operation of the safety edge results in energization of the safety-edge relay SEB. This relay opens its break contacts SEB2 to start a timing out operation of the relay SET. The relay SET may have a delay in dropout of the order of 3 seconds.

If the safety edge is released prior to the dropout of the relay SET, the safety edge relay SEB drops out to close its break contacts SEB2 and the edge-timing relay SET consequently is reenergized before it can drop out to modify the operation of the system. For present purposes, it will be assumed that the safety edge is operated for a time sufficient to assure dropout of the edge-timing relay SET. Under the assumed conditions, the closure of the make contacts SEB1 has no effect on the operation of the system. Had the switch 85 been closed, the closure of the make contacts SEB1, together with the closed break contacts M7, would establish a holding circuit for the relay SEB until the elevator car is conditioned to leave the floor at which time the break contacts M7 open.

Turning now to Fig. 3, it should be noted that closure of the make contacts SEB3 completes with the switch 86 an energizing circuit for the lamps 86A. Each of the lamps indicates to persons on one of the floors that the safety edge of the elevator car is being held. Closure of the make contacts SEB4 has no immediate effect on the operation of the system.

Upon the expiration of the dropout time for the edge-timing relay SET, the break contacts SET1 close to complete the following three circuits:

L+, SET1, 87, SIG, HS3, L−,
L+, SET1, 87, HS, M8, L− and
L+, SET1, 87, SIG, SEB4, DO3, L−

The signal SIG now operates to warn persons in or adjacent the elevator car that the safety edge is being held unduly long.

The energization of the signal stop relay HS results in closure of the make contacts HS1 (Fig. 2) to complete with the contacts 70T1, TN1 and N1 an energizing circuit for the door-control relay 45. Consequently, the make contacts HS1 prevent further reopening of the elevator car door. In addition, the break contacts HS2 open to introduce the resistor R3 in series with the door-close solenoid DC. Consequently, the positive closure of the door is effected with a reduced closing force.

Referring to Fig. 3, it will be noted that the relay HS also closes its make contacts HS4 to establish a holding circuit around the contacts SET1 and DT1. Consequently, the release of the safety edge will not result in deenergization of the signal stop relay HS. Finally, the signal stop relay opens its break contacts HS3.

If the elevator car door is permitted to reopen at this time (i. e., make contacts HS1 are not employed), the opening of the break contacts DO3 would interrupt the sounding of the signal SIG. However, the ensuing closing operation would be accompanied by closure of the break contacts DO3 to permit further operation of the signal.

If the safety edge is released during the closure of the elevator car door, the make contacts SEB4 open to interrupt the sounding of the signal SIG. However, if the safety edge is operated again before the door closes, the signal again will be sounded.

When the safety edge is released, the make contacts SEB1 open under the assumed conditions without immediate effect on the operation of the system. Break contacts SEB2 close to reenergize the edge-timing relay SET. Make contacts SEB3 (Fig. 3) open to extinguish the lamps 86A, and make contacts SEB4 open to prevent further sounding of the signal.

When the elevator car A finally is prepared to leave the floor, the car-running relay picks up in the manner previously set forth and opens its break contacts M8. This results in deenergization of the signal-hold relay HS. The relay in turn opens its make contacts HS1 and HS4, and closes its break contacts HS2 and HS3 without immediate effect on the operation of the system.

By inspection of Fig. 2, it will be noted that the contacts SE1 and SEA1 control the door control relay 45 in the same manner. Also, the contacts SE2 and SEA2 control the safety-edge relay SEB in the same manner. Consequently, operation of either of the safety edges has substantially the same effect on the operation of the system.

Let it be assumed next that a person operates the door-hold button while the elevator car is stopped at a floor. The contacts DHB1 are in series with the contacts SE1 and control the door-control relay 45 in the same manner.

The operation of the door-hold button also results in closure of the contacts DHB2 to energize the door-hold relay DH. If the switch 83 is closed, the energization of the door-hold relay results in closure of the make contacts DH1 to establish with the break contacts M6 a self-holding circuit which is interrupted only when the elevator car is set to leave the floor at which time the break contacts M6 open. For present purposes, it will be assumed that the switch 83 is open.

The energization of the door-hold relay DH also opens break contacts DH2 to start a timing-out operation of the door-hold timing relay DT. This relay desirably may have a longer time delay than that employed for the relay SE1. As an example, the relay DT may have a dropout time of the order of 6 seconds.

If the door-hold button is released before dropout of the relay DT, the relay DT is reenergized without affecting the operation of the system. However, it will be assumed that the door-hold button is operated for a time sufficient to assure dropout of the door-hold time relay DT. The doorhold timing relay thereupon closes its break contacts DT1. Since these contacts are in parallel with the contacts SET1, the effect of closure of these contacts will be understood from the foregoing discussion of the closure of the contacts SET1.

After the closure of the break contacts DT1 if the door-hold button is operated during a closing operation of the door, the make contacts DH3 are closed to complete an energizing circuit for the signal SIG. This continues until the elevator car is prepared to leave the floor at which time the break contacts M8 open to deenergize the signal stop relay HS. The operation of this relay previously has been considered.

*Figure 5*

Fig. 5 illustrates a modified door operation which may be employed in lieu of the door operation discussed with reference to Figs. 1 to 4. The door control relay 45 again is employed in Fig. 5 and is again energized through a circuit which includes the break contacts 70T1, N1, and TN1, together with the door-hold button contacts DHB1. These contacts operate in exactly the same manner discussed with reference to Fig. 2. In addition, the energizing circuit for the door-control relay 45 includes break contacts DOA1 of an auxiliary door-open relay and make contacts 45T1 of a non-start relay 45T. The door control relay 45 also has associated therewith the self-holding circuit including the contacts M2 and 45-1 which operate in the manner set forth with reference to Fig. 2.

The non-start relay 45T is employed for initiating a reopening operation of the door in the event that the elevator car A fails to start from the floor at which it is stopped within a reasonable time. The relay 45T is energized through break contacts 80-2 of the main starting relay in parallel with break contacts DC1 which are operated by the door-close solenoid DC. The relay 45T may have a substantial time delay in dropout within which the elevator car A should leave the floor. For example, the delay may be of the order of 10 seconds.

The door-open solenoid DO of Figs. 1 and 2 is employed in the modification of Fig. 5 but is connected in a somewhat different circuit. When a door-opening operation is to be initiated, the break contacts SA1 and TB2 are open whereas the make contacts SA2 are closed. The limit switch 38-3 is closed when the door is away from its fully open position. Under the assumed conditions, the break contacts DC2 of the door-close solenoid are closed. Consequently, when the break contacts 45-3 of the door-control relay close, the following door-opening circuit is completed:

L+, DO, SA2, DC2, 38-3, 45-3, L−

The auxiliary door-open relay DOA is connected, together with a limit switch 38-2 across the solenoid DO for energization therewith. The limit switch 38-2 is normally closed and opens as the door reaches its fully open position.

When a person operates a safety edge, the make contacts SA2 open and the break contacts SA1 close. If the door is closing at the time, the break contacts 45-4 of the door control relay are open. However, the make contacts TB1 are closed and complete with the break contacts SA1 an energizing circuit for the door-open solenoid, and this solenoid quickly plugs the door to a complete stop. A plug relay is arranged to open the make contacts TB1 with time delay sufficient to assure plugging or stopping of the door just as the contacts open. The break contacts TB2 may be arranged to close slightly after the make contacts TB1 open in order to permit prior opening of the make contacts DOA2 of the door-open relay DOA.

The door-close solenoid DC is energized through a circuit which includes make contacts 80-3 of the start relay 80 and the make contacts 45-2 discussed with reference to Fig. 2. In addition, the energizing circuit includes break contacts DO3 which are operated by the door-open solenoid DO and make contacts SA3 of the door-retain relay SA.

A door-reverse relay TA is connected across the buses through the contacts SE1 and SEA2 of the safety edges. This relay has a time delay in dropout which may be of the order of 1½ seconds. The relay is employed to initiate a reopening of the door if the safety edge is held for a time sufficient to permit dropout of the relay.

The door-retain relay SA is connected across the winding of the relay TA through break contacts DOA3 of the door-open relay and a push button DPB. This push button is located within the elevator car and may be employed in lieu of or in addition to the door-hold button DHB. For present purposes, it will be assumed that both of the buttons are employed. When the push button DPB is operated during a closing movement of the door, the door is stopped but is not reopened. If desired, the push button DPB may be made effective only during the first part of the door-closing movement by connecting in shunt therewith a mechanical switch which is open only during the first part of the door movement. However, for present purposes, it will be assumed that the push button is effective to stop the door at any point during the closing movement of the door.

The plug relay TB is energized through make contacts SA4 of the door-retain relay SA. The relay TB has a time delay in dropout sufficient to permit the rapid stopping of the door by a plugging action of the door-open solenoid DO. For example, this time delay may be of the order of ¼ of a second.

The operaton of the modification illustrated in Fig. 5 now will be considered. It will be understood that this modification is employed for controlling the door of the elevator car A in the system of Figs. 1 to 4. A similar control may be provided for the door of each of the elevator cars in the system.

If the door of the elevator car A is completely open and if the safety edges and the push button DPB are unoperated, both of the relays TA and SA are picked up, and the contacts TA1, SA2, SA3 and SA4 are closed, whereas the break contacts SA1 are open. Inasmuch as the contacts SA4 are closed, the plug relay TB is picked up and its make contacts TB1 are closed, whereas the break contacts TB2 are open.

The break contacts DC1 and 80–2 are closed, and the non-start relay 45T is picked up. Consequently the make contacts 45T1 are closed.

When the non-interference relay 70T times out, the main start relay 80 picks up if the car is to start at this time, and the break contacts 70T1 close to complete the following energization circuit for the door control relay 45:

L+, 70T1, 45E1, DOA1, DHB1, TA1, N1, TN1, 45, L−

The operation of the components 70T1, DHB1, N1, TN1, N2, and 45–1 will be understood from the discussion of Figs. 1 to 4.

As a result of its energization, the door control relay 45 opens its break contacts 45–3 and 45–4 to prevent energization therethrough of the door-open relay DO and closes its make contacts 45–2 to complete the following energizing circuit:

L+, 80–3, DC, SA3, DO3, 45–2, L−

The door-close solenoid now is energized and operates to move the door towards closed position in the manner discussed with reference to Fig. 1. As the door moves away from its fully open position, limit switches 38–2, 38–3 are operated to closed positions.

Opening of the contacts 80–2 is followed by opening of the contacts DC1 to start a timing-out operation of the relay 45T. If the car starts before the relay drops out, the contacts 80–2 reclose to reenergize the relay 45T. If the car does not start within the relay drop-out time, the relay 45T opens its contacts 45T1 to initiate a door-reopening operation.

Let it be assumed next that as the door is being closed, a person engages one of the safety edges, such as the safety edge SE to open the contacts SE1. This results in deenergization of the relays SA and TA. The relay TA has a time delay in dropout of the order of 1½ seconds, and consequently, now starts to time out.

The deenergization of the door-retain relay SA results in opening of the make contacts SA4 to start a timing-out operation of the plug relay TB. As previously mentioned, this relay has a time delay in dropout of the order of ¼ of a second. In addition, make contacts SA3 open to deenergize the door close solenoid DC. Opening of make contacts SA2 does not affect the immediate operation of the system. However, closure of the break contacts SA1 completes with the make contacts TB1 an energizing circuit for the door-open solenoid DO, and the energized solenoid DO quickly plugs the door to a stop. As the door comes to a stop, the plug relay TB drops out to open its make contacts TB1 for the purpose of deenergizing the door-open solenoid DO. Closure of the break contacts TB2 has no effect on the immediate operation of the system.

If the safety edge is released before the relay TA drops out, the relays TA and SA are reenergized. Opening of break contacts SA1 and closure of make contacts SA2 has no effect on the immediate operation of the system. Make contacts SA3 upon closing complete the energizing circuit for the door-close solenoid DC, and the door resumes its closing movement. Closure of make contacts SA4 energizes the plug relay TB which opens its make contacts TB1 and closes its make contacts TB2 without immediate effect on the operation of the system. Consequently, a brief operation of the safety edges merely results in the stopping of the door without initiating a door-reopening operation.

Let it be assumed that in the foregoing example the safety edge is held for a period sufficient to permit dropout of the door-reverse relay TA. The dropout of this relay results in opening of the make contacts TA1 to deenergize the door control relay 45. The resultant opening of the make contacts 45–1 and 45–2 does not affect the immediate operation of the system. Closing of the break contacts 45–4 also does not affect the immediate operation of the system. However, the closure of the break contacts 45–3 completes the following circuit:

L+, DO, TB2, DC2, 38–3, 45–3, L−

The energization of the door-open solenoid DO results in a reopening of the door in the manner discussed above. Consequently, if a safety edge is held for a substantial length of time, a reopening operation of the door is initiated.

Let it be assumed next that during a closing operation of the door the push button DPB is operated to deenergize the door-retain relay SA. This relay operates in the manner previously described to stop the door promptly without reopening the door. When the push button is released, the relay SA is reenergized and the closing movement of the door is continued.

*Figure 6*

Fig. 6 illustrates a modification of the system previously described wherein an elevator car door is controlled to follow movement of a safety edge carried by the door. In addition, Fig. 6 illustrates circuits employing a beam of light for controlling the operation of an elevator car door.

In Fig. 6, the door control relay 45 is energized through the contacts 70T1, DHB1, N1 and TN1 which operate in the manner previously described. In addition, the make contacts 45T1 of the non-start relay of Fig. 5 are employed for the same purpose. Break contacts DO3 open during an opening operation of the door to prevent energization of the door-control relay 45. Finally, the energizing circuit for the relay 45 includes the parallel contacts TE1–1, TE4–1. The contacts TE1–1 open when a beam of light across the door opening is interrupted for the purpose of initiating a reopening operation of the door. When the beam of light is reestablished, the break contacts TE1–1 reclose with a time delay which may be of the order of 1 second.

The break contacts TE4–1 normally are closed. They are opened if the beam of light across the door opening is interrupted for a substantial time such as 4 seconds. Contacts M2 and 45–1 operate in the manner previously described to establish a holding circuit for the door control relay 45.

The non-start relay 45T was discussed in connection with Fig. 5.

The door-open solenoid DO is energized through the limit switch 38–1 and the break contacts 45–3 in the manner described in connection with Fig. 2. In addition, a switch SE3 operated by the safety edge SE is connected across the contacts 45–3. The switch SE3 is open as long as the safety edge is not operated. Even after operation of the safety edge, substantial motion of the safety edge relative to the door is required in order to close the safety-edge contacts SE3.

The break contacts 45–3 also are shunted by a circuit containing the break contacts SB1 of the edge relay SB and make contacts SBT1 of a plug relay SBT. These relays are energized through contacts SE2 which are operated by the safety edge SE. Only a slight movement of the safety edge relative to the door is required to open the normally closed contacts SE2 for the purpose of deenergizing the relays SB and SBT. The relay SBT drops out with a slight time delay, such as ¼ second, which is sufficient to assure a plugged stopping operation of the door.

The door-close solenoid DC is energized through the break contacts 40D2 and the make contacts 45–2 of relays which operate in the manner discussed with reference to Fig. 2. In addition, the energizing circuit includes break contacts DO4 of the door-open solenoid DO and make contacts SB2 of the edge relay SB. The break contacts 40D2 are shunted by make contacts 80–3 of the start relay.

The operation of the portion of Fig. 6 thus far described now will be considered. It will be assumed first that the door has started a closing movement and that the safety edges are not operated. Under such circumstances, the relays 45, 45T, SB, SBT and DC are all energized and picked up. As the door continues its closing movement it will be assumed that a person holds his hand stationary in position to engage the safety edge SE of the door. When the safety edge reaches the person's hand, the safety edge moves slightly with respect to the associated door to open the contacts SE2. As a result of such opening, the plug relay SBT starts to time out and the relay SB promptly drops out. As a result of its dropout, the relay SB opens its make contacts SB2 to deenergize the door-close solenoid DC. In addition, the break contacts SB1 close to complete with the make contacts SBT1 and the limit switch 38–1 an energizing circuit for the door-open solenoid DO. The energization of the door-open solenoid is so rapid that the safety-edge contacts SE3 are not closed.

As the door comes to a stop, the plug relay SBT drops out to open its make contacts SBT1. This interrupts the energizing circuit for the door-open solenoid and the door remains stationary.

If the person thereafter removes his hand from the safety edge, the resultant closure of the contacts SE2 reenergizes the relays SB and SBT. The resultant opening of the break contacts SB1 prevents energization therethrough of the door-open solenoid DO. Closure of the make contacts SB2 reenergizes the door-close solenoid DC, and this solenoid resumes its closing movement. Closure of the make contacts SBT1 has no immediate effect on the operation of the system.

Let it be assumed next that after the person has brought the door to a stop as a result of his engagement of the safety edge, he moves the safety edge towards the associated door sufficiently to close the switch SE3. As a result of such closure, the door-open solenoid SE3 is energized to move the door towards its open position. If the person again brings his hand to a stop, the door continues its opening movement only for a time sufficient to open the switch SE3 and to bring the door to a stop.

Thus, from a consideration of this description, it follows that the door tends to move with the hand of the person engaging the safety edge. If the person moves his hand slowly to the left, the door will move slowly to the left in discrete steps. If the hand of the person moves slowly to the right, the door follows his hand in discrete steps. Since the door safety edge remains continuously in contact with the hand of the person, the person is continuously reminded that he is holding the door open and preventing movement of the elevator car.

Figure 1A:
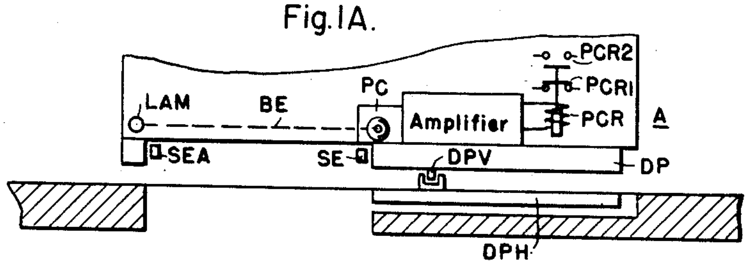
Fig. 1A is a view in section with parts broken away showing an elevator car employed in Fig. 1 associated with a hoistway.

If the ray or beam of light BE of Fig. 1A is employed for protecting the door opening, the switch 93 of Fig. 6 may be closed to render effective the ray relay TE1 and the ray cutout relay TE4. The ray relay TE1 is energized through make contacts M9 of the car-running relay M, the break contacts PCR1 of the photocell relay PCR or the make contacts DO6 operated by the door-open solenoid DO. This relay TE1 has a small delay in dropout, such as 1 second, which preferably is sufficient to permit a passenger to pass through the door opening.

The ray cutout relay TE4 is energized initially through make contacts M10 of the car-running relay M. When once picked up, the relay TE4 closes its make contacts TE4–2 to permit energization of the relay through make contacts PCR2 of the photocell relay PCR or make contacts DO5 which are operated by the door-open solenoid DO.

In order to consider the operation of the relays TE1 and TE4, it will be assumed that the elevator car A is approaching a floor at which it is to stop. Under these circumstances, the contacts M9 and M10 of the car-running relay are closed, and both of the relays TE1 and TE4 are energized and picked up. Consequently, the break contacts TE1–1 and TE4–1 are both open, and the make contacts TE4–2 are closed.

As the elevator car stops at the floor, the make contacts M9 and M10 open as a result of the dropout of the car-running relay M in the manner previously described. However, before the relays TE1 and TE4 can drop out the make contacts DO4 and DO5 of the door-open solenoid close to maintain the energization of these relays. Furthermore, inasmuch as the ray or beam of light BE (Fig. 1A) is employed, the relay PCR is picked up. Consequently, the break contacts PCR1 (Fig. 6) are open, and the make contacts PCR2 are closed to complete with the contacts TE4–2 an energizing circuit for the relay TE4.

The elevator car door now opens, and as it reaches its fully open position, the contacts DO6 and DO5 open. This starts a timing-out operation of the ray relay TE1. Upon the expiration of the time delay of this relay, the relay drops out to close its break contacts TE1–1, thereby permitting energization of the door-control relay 45 for the purpose of permitting a closing operation of the door.

Let it be assumed that as the door starts to close a person enters the opening to interrupt the ray or beam of light BE. As a result of such interruption, the photocell relay PCR drops out to close its break contacts PCR1 and reenergize the relay TE1. This relay opens its break contacts TE1–1 to deenergize the door control relay 45. The relay 45 thereupon drops out to initiate a door-opening operation in the manner previously described. In addition, make contacts PCR2 open to start a timing-out operation of the relay TE4.

If the person clears the opening prior to the dropout time of the relay TE4, the beam BE is reestablished and the photocell PCR opens its break contacts PCR1 to deenergize and start a timing-out operation of the relay TE1. Following expiration of the 1 second time delay of this relay, the relay closes its break contacts TE1–1 to permit reenergization of the door control relay 45 for the purpose of closing the elevator car door. In addition, closure of make contacts PCR2 at this time reenergizes the relay TE4 before this relay drops out.

In this way as long as persons pass through the doorway within 4 seconds of each other, the elevator car door reopens for a period of approximately 1 second.

Let it be assumed next that the person interrupting the beam BE maintains this interruption continuously for a period in excess of 4 seconds. It will be recalled that such interruption of the beam results in closure of the break contacts PCR1 to reenergize the relay TE1 and also in opening of the make contacts PCR2 to start a timing-out operation of the relay TE4.

At the expiration of the 4-second time delay of the relay TE4, the relay drops out to close its break contacts TE4–1. Such closure permits energization of the relay 45 to close the elevator car door, regardless of the condition of the relay TE1. In addition, the dropout of the relay TE4 is accompanied by opening of the make contacts TE4–2. Consequently, once the relay TE4 drops out, both of the relays TE1 and TE4 are ineffective for initiating a reopening of the elevator car door. Although the closing force acting on the door is insufficient to injure a person in the closing path of the door, the force encourages such a person to clear the doorway.

*Figure 7*

In the discussion of Fig. 3, reference was made to make contacts TH1 and QH1 which are associated with the rate relay TH and the quota relay QH. Suitable circuits for energizing these relays are illustrated in the lower half of Fig. 7.

The relay TH is intended to respond to a predetermined service demand for the elevator system. Thus, the relay may be responsive to the rate at which calls are registered by the floor-call storing relays. In order to illustrate such operation of the relay TH, it wil be assumed that each of the floor-call push buttons is provided with means for energizing one of the relays 2DT to 4DT and 2UT to 4UT briefly for each registration of a floor call. In the embodiment of the invention illustrated, each of the push buttons 2D to 4D and 2U to 4U is provided with an auxiliary set of contacts 2DA to 4DA and 2UA to 4UA, respectively. Each of the sets of contacts is associated with one of the relays 2DT to 4DT and 2UT to 4UT. For example, closure of the auxiliary contacts 2DA completes an energizing circuit for the relay 2DT which is interrupted as soon as the push button is released. The relay 2DT has a substantial time delay in dropout which may be of the order of 60 seconds. As clearly shown in Fig. 7, each of the remaining relays of the group is associated in a similar manner with one of the sets of auxiliary contacts.

Make contacts 2DT1 to 4DT1 and 2UT1 to 4UT1 associated with the relays mentioned in the preceding paragraph are connected in parallel arms of a circuit for controlling in parallel the energization of the rate relay TH. Each of the sets of contacts has in series therewith a separate resistor 2RD to 4RD, 2RU to 4RU, respectively. The resistors are so proportioned with respect to the relay TH that at least a predetermined number of resistors must be operatively connected in the energizing circuit for the relay to pick up the relay. For present purposes, it will be assumed that the relay TH picks up when energized through three or more of the resistors. This corresponds to an average rate of calls of three per minute for energizing relay TH.

The quota relay QH is connected across the buses L+, L− through a circuit having a plurality of parallel arms, each including make contacts of a separate one of the floor-call storing relays and a resistor. For example, one of the arms includes make contacts 2DR2 of the floor-call storing relay for the second floor and the resistor 2RDA. Connections of the remaining contacts and resistors are clearly indicated in Fig. 7.

The quota relay is proportioned relative to the resistors to pick up when at least a predetermined number of the resistors are connected in the energizing circuit. For present purposes, it will be assumed that the quota relay picks up when it is energized through three or more of these resistors.

In Fig. 2, make contacts CO1 were illustrated for controlling in part the operation of the door-control relay 45. Circuits for energizing this relay are illustrated in Fig. 7. As clearly shown in Fig. 7, the relay CO cannot be energized unless the break contacts DO9 operated by the door-open solenoid and break contacts M11 operated by the car-running relay are closed. In addition, one of the three other conditions must be satisfied. Thus, the make contacts TH3 may be closed to indicate that a substantial rate of demand for service exists on the system. Alternatively, the make contacts QH3 of the quota relay may be closed for the purpose of indicating a predetermined demand for elevator service on the system. Finally, the load weighing switch PL1 may be closed to indicate that the elevator car A is substantially loaded.

The operation of the relay CO now will be reviewed. Let it be assumed that the elevator car A is approaching a floor at which it is to stop. Under these circumstances, the break contacts M11 of the car-running relay M are open to prevent energization of the relay CO. As the elevator car comes to a stop, the car-running relay drops out to close break contacts M11. These contacts close with a slight delay which is sufficient to permit prior pickup of the door-open solenoid DO and consequent opening of the break contacts DO9 to prevent energization of the relay CO. When the door reaches its fully open position, the door-open solenoid drops out to close the break contacts DO9. If a predetermined service demand exists on the system, the relay CO now is energized. It will be assumed for present purposes that a sufficient load is present on the platform of the elevator car to operate the load weighing switch PL1 for the purpose of completing an energizing circuit for the relay CO. This relay now closes its make contacts CO1 (Fig. 2). If the switch 81 is closed, it follows that the closure of the contact CO1 shunts the contacts 70T1, SE1 and SEA1 and the push button contacts DHB1. Consequently, the components which normally can delay the closure of the elevator car door are rendered ineffective, and the door is closed promptly. Consequently, whenever the service demand of the system warrants, the non-interference time of the door and delay controls for the door may be rendered ineffective for the purpose of speeding up the elevator service.

In Fig. 1, the lever 28 is employed for opening and closing the door and is controlled directly by the solenoids DO and DC. In Fig. 7, a rotary motor 97 having an armature 97A and a field winding 97F is employed for controlling movement of the lever 28. To this end, the armature of the motor is coupled to the lever through a gear 99 and a rack 101. By inspection of Fig. 7, it will be observed that rotation of the armature in one direction operates through the gear and the rack to move the lever 28 in the door-opening direction. Reverse movement of the armature moves the lever 28 in the door-closing direction.

The field winding 97F is connected for energization in series with the armature 97A across the buses L+ and L−. The connections are effected through make contacts DC6 and DC7 of the door-close solenoid, and contacts DO6 and DO7 of the door-open solenoid. These contacts in effect constitute a reversing switch for connecting the motor for door-opening or door-closing rotation. Thus, for a door-opening operation, the following circuit is established:

L+, 97F, DO7, 97A, L1, DO6, L−

For a door-closing operation, the following circuit is established:

L+, 97F, DC6, L1, 97A, DC7, L−

The speed and the force exerted by the motor are controlled for the purpose of providing a preferred operation. Thus, the speed of the motor during a door-closing operation is determined by an adjustable resistor 105 which is connected across the armature through break contacts DO8 of the door-open solenoid. During a door-opening operation, the speed of the motor is controlled by an adjustable resistor 107 which is connected across the armature through break contacts DC8 of the door-close solenoid.

When a substantial service demand exists in the system, it is desirable to prevent undue holding of the elevator car door. To this end, the door safety edge SE of Fig. 1 is provided with contacts SE4 which are normally closed to energize an edge relay SEY. When the safety edge is operated for the purpose of delaying closure of the door, the contacts SE4 open to deenergize the edge relay SEY. This relay opens its break contacts SEY1 to prevent energization of a door force relay L. The door force relay is ineffective during a door-opening operation for the reason that the break contacts DO10 of the door-open solenoid then are open.

It will be noted that energization of the door force relay L is completed through one of the sets of contacts TH3, QH3 and PL1. Consequently, a substantial demand for elevator service must exist before the relay L can be energized.

Break contacts L3 of the relay L are employed for connecting a resistor 109 in shunt with the field winding 97F. If the switch 111 is closed, make contacts L2 of the door force relay are effective for connecting a capacitor CAP and a resistor 113 in parallel across the armature 97A of the motor. Finally, break contacts L1 of the relay are effective for shunting the resistor 103.

The effect of the relay L on the closure of the door now will be considered. Let it be assumed that the elevator car door is being closed at a time when the elevator car A is substantially loaded, and the switch PL1 consequently is closed. Since the doors are closing, the break contacts DO10 are closed.

At this time, it is assumed that a passenger engages the safety edge of the door and opens the contacts SE4 to deenergize the relay SEY. This relay closes its break contacts SEY1 to complete an energizing circuit for the relay L. At the same time, the relay CO also is energized and picked up, consequently, make contacts CO1 (Fig. 2) are closed to complete with the switch 81 a circuit which prevents reopening of the elevator car door.

As a result of its energization, the relay L opens its break contacts L1 to introduce the resistor 103 in series with the armature 97A of the motor. Break contacts L3 open to interrupt the shunt established across the field winding 97F by the resistor 109. Consequently, the increased field current and the decreased armature current result in the continued closure of the door at a lower speed but with an increased closing force. The increased closing force is sufficient to urge persons in the closing path of the door away from such path but preferably is insufficient to shock or hurt such person.

A further control may be effected by closing the switch 111. If the switch is closed, the closure of the make contacts L2 connects the capacitor CAP and the resistor 113 across the armature of the motor. The charging current required by the capacitor CAP is proportioned to drop the voltage across the voltage 97A briefly to a low value which is insufficient to produce movement of the door. As the voltage across the capacitor builds up, the force exerted by the motor 97 increases. Consequently, the effect of the capacitor is to cause the door to halt briefly and then resume its closing movement at a lower speed and under a larger closing force. The resistor 113 has a high value of resistance and is employed for establishing a discharge path across the capacitor. Consequently, when the contacts L2 open, the charge on the capacitor is dissipated through the resistor 113.

If the switch 81A (Fig. 2) is closed, the pick-up of the relay L closes the make contacts L4 to complete a shunt across the contacts 80–1 of the main starting relay 80. Under these circumstances a starting circuit for the elevator car A is completed as soon as the contacts 40D1 close to indicate that the elevator doors are closed.

*Figure 8*

In Figure 1, special entrances 50A and 51A are provided for prospective passengers who desire transportation respectively in the up and down directions. As a passenger proceeds through one of these entrances, he interrupts light beams by which his entrance is detected. If an elevator car is stopped at the floor for travel in the direction desired by the person, the departure of the elevator car will be delayed for a reasonable time to permit the person to reach the elevator car and enter it before its departure.

In Fig. 8 of the Williams et al. Patent 2,193,609, the association of the light beams with photocells and relays is clearly illustrated. In order to simplify the presentation of this aspect of applicant's invention, it will be assumed that the contacts 2DX5, 3DX5 and 4DX5 of Fig. 8 are operated by the relays 2DX, 3DX and 4DX employed in the aforesaid Williams et al. system. Each of these contacts is employed for connecting a separate contact segment for each of the elevator cars to the bus L+. For example, the make contacts 2DX5 are employed for connecting a contact segment *k*2 for the elevator car A and a contact segment B*k*2 for the elevator car B to the bus L+. As shown in Fig. 8, a similar set of contacts and a similar pair of contact segments are provided for each of the floors for which departure of a stopped elevator car is to be delayed by an approaching prospective passenger.

It will be understood that the contact segments *k*4 to *k*2 are arranged on the floor selector of Fig. 1 and are successively engaged by a brush 121 as the elevator car A proceeds from the upper terminal floor towards the lower terminal floor.

The brush 121 is connected to the bus L— through make contacts X7 of the down-preference relay and a car-delay relay CDR. The relay CDR has an adjustable time delay in dropout which preferably is adjusted to a value sufficient to permit a passenger to move from the entrance 51A of Fig. 1 to the elevator car A. If the elevator car B is located at a greater distance from the entrance 51A, the relay BCDR for the elevator car B may have a longer time delay.

Break contacts CDR1 of the car-delay relay with the shunting switch 82 are located in the energizing circuit for the door-control relay 45 of Fig. 2. Consequently, if the switch 82 is open the relay 45 can be energized to close the door of the elevator car A only if the break contacts CDR1 are closed.

To illustrate the operation of the components illustrated in Fig. 8, let it be assumed that the switch 82 (Fig. 2) is open, that the elevator car A is stopped at the third floor, that the elevator car is set for down travel (make contacts X7 are closed) and that a prospective passenger is entering the entrance 51A. The movement of the passenger through the entrance operates the relay 3DX in the manner set forth in the aforesaid Williams et al. patent to close the make contacts 3DX5 and connect the contact segment *k*3 to the bus L+.

Inasmuch as the brush 121 is in engagement with the contact segment *a*3, the brief closure of the contacts 3DX5 is effective to complete with the contacts X7 a brief energizing circuit for the relay CDR. This relay picks up to open the energizing circuit for the door-control relay 45 and thereafter starts to time out. During the time-out period of the relay, the elevator car door cannot close and the prospective passenger proceeds to the elevator car A and enters the car. The relay CDR then drops out to close its break contacts CDR1 which permits energization of the relay 45 in the manner discussed with reference to Figs. 1 to 4 for the purpose of closing the car door.

Although the car delay for prospective passengers is illustrated in Fig. 8 only for passengers desirous of proceeding in the down direction, it will be understood that relays similar to the relay CDR may be associated with the up entrance 50A of Fig. 1 for the purpose of providing similar delays for passengers desirous of proceeding in the up direction. In such a case, the make contacts 2DX5 to 4DX5 would be replaced by contacts of the relays 2UX to 4UX of the aforesaid Williams et al. patent. In addition, the make contacts X7 and BX7 of the down-preference relay would be replaced by similar contacts of the up-preference relay.

Although the invention has been described with reference to certain specific embodiments thereof, numerous modifications falling within the spirit and scope of the invention are possible. Therefore, the embodiments herein presented are to be construed in an illustrative and not in a limiting sense.

I claim as my invention:

1. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, retarding means operable during a door-closing operation for retarding closure of the door, and translating means operating in response to the lapse of a substantial time larger than the normal door-closing time measured from operation of the retarding means without door closure.

2. A system as claimed in claim 1 wherein the translating means comprises a signal for indicating failure of the door to close within said substantial time.

3. A system as claimed in claim 1 wherein the translating means comprises expediting means effective to decrease the retarding effect of the retarding means when operated after the lapse of said substantial time without door closure.

4. A system as claimed in claim 1 wherein the retarding means comprises means for initiating a door reopening operation, and wherein said translating means is responsive to lapse of said substantial time without door closure for preventing reopening of the door by the retarding means.

5. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, first retarding means operable during a door-closing operation for retarding closure of the door, second retarding means operable during a door-closing operation for retarding closure of the door, first translating means operating in response to the lapse without door closure of a substantial time larger than normal door-closing time measured from operation of the first retarding means for modifying the response of the door to operation of the first retarding means, and second translating means operating in response to the lapse without door closure of a time longer than said substantial time measured from operation of the second retarding means for modifying the response of the door to operation of the second retarding means.

6. In an elevator system, a structure having a pair of terminal landings and a plurality of intermediate landings, an elevator car having a door, door-closing means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, first reopening means operable during a door-closing operation for initiating a door-opening operation, second reopening means operable during a door-closing operation for initiating a door-opening operation, first translating means responsive to the lapse without door closure of a substantial time larger than normal door-closing time measured from operation of the first retarding means for rendering the first retarding means ineffective to initiate a reopening of the door, and second translating means responsive to the lapse without door closure of a time longer than said substantial time measured from operation of the second retarding means for rendering the second retarding means ineffective to initiate a reopening of the door.

7. In an elevator system, a structure having a plurality of landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car and opening of the door at said selected landing for initiating a door-closing operation of the door-operating means, and door-retarding means effective when operated during a door closure for reducing the closing force to permit substantially stopping of the door and holding of the door in the stopped position, said door-retarding means being effective when released following an operation thereof for initiating a reapplication of force to the door to complete closure of the door.

8. A system as claimed in claim 7 wherein the door-retarding means includes reopening means responsive to operation for a substantial time of the door-retarding means for initiating a door-opening operation of the door-operating means.

9. In an elevator system, a structure having a plurality of landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car and opening of the door at said selected landing for initiating a door-closing operation of the door-operating means, and door-retarding means effective when operated during a door closure for reducing the closing force to permit substantially stopping of the door and holding of the door in the stopped position, said door-retarding means including reopening means responsive to operation for a substantial time of the door-retarding means for initiating a door-opening operation of the door-operating means, said door-retarding means being responsive to the presence of an object in the closing path of the door.

10. In an elevator system, a structure having a plurality of landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car and opening of the door at said selected landing for initiating a door-closing operation of the door-operating means, and door-retarding means effective when operated during a door closure for reducing the closing force to permit substantially stopping of the door and holding of the door in the stopped position, said door-retarding means being responsive to the presence of an object in the closing path of the door.

11. A system as claimed in claim 10 wherein said door-retarding means is effective when operated for substantially stopping the door for a time and thereafter continuing the door-closing operation.

12. A system as claimed in claim 11 wherein the retarding means operates during said continuing of the door-closing operation to reduce the closing speed of the door and to increase the closing force acting on the door.

13. In an elevator system, a structure having a plurality of landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car and opening of the door at said selected landing for initiating a door-closing operation of the door-operating means, and door-retarding means effective when operated during a door-closure for reducing the closing force to permit substantially stopping of the door and holding of the door in the stopped position, provided that the door is located in a first zone adjacent its fully open position, said door-retarding means when operated during door closure, if the door is displaced from said first zone, being effective for initiating a door-opening operation of the door-operating means.

14. In an elevator system, a structure having a plurality of landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car and opening of the door at said selected landing for initiating a door-closing operation of the door-operating means, retarding-means responsive to presence of an object in the path of the door when closing for initiating a door-reopening operation, and modifying means responsive to a predetermined service demand for rendering said retarding means ineffective to initiate a door-reopening operation but effective in response to presence of an object in the path of the door when closing for adjusting the door-operating means to close the door at a reduced speed.

15. In an elevator system, a structure having a plurality of landings, an elevator car having a passage through which an object may pass between the exterior and interior of the car, means mounting the elevator car for movement relative to the structure to serve the landings, motive means for moving the elevator car, and control means cooperating with the motive means for controlling operation of the elevator car, said control means comprising means for stopping the elevator car at a selected landing, start-initiating means for initiating a starting operation of the stopped elevator car, a detector device responsive to presence of an intending passenger at a point substantially displaced from the stopped elevator car for operation from a first to a second condition, and delay means responsive to operation of the detector device to the second condition for delaying starting of the elevator car by the start-initiation means for a substantial time.

16. In an elevator system, a structure having a plurality of landings, a plurality of elevator cars each having a passage through which an object may pass between the exterior and interior of the car, each of the cars having a door and door-operating means for opening and closing the door, means mounting each of the elevator cars for movement relative to the structure to serve the landings, motive means for moving each of the elevator cars, and control means cooperating with the motive means for controlling operation of each of the elevator cars, said control means comprising means for stopping any of the elevator cars at a selected landing and initiating a door-opening operation of the door-operating means of the stopping elevator car to permit load transfer at the selected landing, door-control means effective after the stopping of any of the elevator cars at the selected landing and a door-opening operation of the door of the stopping elevator car for initiating a door-closing operation of the door-operating means, a detector device responsive to presence of an intending passenger at a point displaced different distances respectively from the cars for operation from a first to a second condition, and delay means responsive to operation of the detector device to the second condition for delaying the starting of the stopped elevator car by the start-initiation means for a time dependent on the distance from the point to the stopping elevator car.

17. In an elevator system, a structure having a plurality of landings, an elevator car having a passage through which an object may pass between the exterior and interior of the car, the car having a door and door-operating means for opening and closing the door, means mounting the elevator car for movement relative to the structure to serve the landings, motive means for moving the elevator car, and control means cooperating with the motive means for controlling operation of the elevator car, said control means comprising means for stopping the elevator car at a selected landing and initiating a door-opening operation of the door-operating means of the stopping elevator car to permit load transfer at the selected landing, means for initiating a door-closing operation of the door when open, demand means operable from a first to a second condition in response to a predetermined service demand, hold means operable from a first to a second condition in response to predetermined prevention of a normal closing operation of said door, and translating means operable from a first to a second condition only in response to operation to their second conditions of both the demand means and the hold means.

18. In an elevator system, a structure having a plurality of landings, an elevator car having a passage through which an object may pass between the exterior and interior of the car, the car having a door and door-operating means for opening and closing the door, means mounting the elevator car for movement relative to the structure to serve the landings, motive means for moving the elevator car, call-registering means operable for registering a call for elevator service from each of the landings, and control means cooperating with the motive means for controlling operation of the elevator car, said control means comprising means for stopping the elevator car at a selected landing and initiating a door-opening operation of the door-operating means of the stopping elevator car to permit load transfer at the selected landing, means for initiating a door-closing operation after the door has reached open position, hold means effective when operated for preventing closure of the door by the door-operating means, a signal for signalling that the door is being prevented from closing, and signal-operating means effective for operating said signal only if a predetermined call registration is registered by the call-registering means and if the hold means has received a predetermined operation.

19. In an elevator ssytem, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, retarding mechanism effective when operated during a closing operation of said door for preventing closure of the door, timing mechanism operating from a first condition to a second condition in response to the lapse of a substantial time measured from operation of the retarding means, and means responsive to operation of the timing mechanism to said second condition for modifying the operation of the retarding mechanism.

20. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, retarding mechanism responsive to presence of a person in the closing path of the door for preventing closure of the door, timing mechanism operating from a first condition to a second condition in response to a lapse of a substantial time measured from operation of the retarding means, and means responsive to operation of the timing mechanism into said second condition for rendering the retarding mechanism incapable of preventing a closing operation of the door.

21. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, retarding means operable during a door-closing operation for retarding closure of the door, signal means effective when operated for conveying information to persons awaiting elevator service at a plurality of said landings, and translating means operating in response to the presence of the elevator car at a landing with the door open for a substantial time larger than the normal door-closing time for operating the signal means for conveying information to a plurality of the landings.

22. In an elevator system, a structure having a plurality of landings, an elevator car having a passage through which an object may pass between the exterior and interior of the car, the car having a door and door-operating means for opening and closing the door, means mounting the elevator car for movement relative to the structure to serve the landings, motive means for moving the elevator car, call-registering means operable for registering a call for elevator service from each of the landings, and control means cooperating with the motive means for controlling operation of the elevator car, said control means comprising means for stopping the elevator car at a selected landing and initiating a door-opening operation of the door-operating means of the stopping elevator car to permit load transfer at the selected landing, means for initiating a door-closing operation after the door has reached open position, hold means effective when operated for preventing closure of the door by the door-operating means, and means responsive to a predetermined service demand for modifying operation of the hold means.

23. In an elevator system, a structure having a plurality of landings, an elevator car having a passage through which an object may pass between the exterior and interior of the car, the car having a door and door-operating means for opening and closing the door, means mounting the elevator car for movement relative to the structure to serve the landings, motive means for moving the elevator car, call-registering means operable for registering a call for elevator service from each of the landings, and control means cooperating with the motive means for controlling operation of the elevator car, said control means comprising means for stopping the elevator car at a selected landing and initiating a door-opening operation of the door-operating means of the stopping elevator car to permit load transfer at the selected landing, means for initiating a door-closing operation after the door has reached open position, hold means effective when operated for preventing closure of the door by the door-operating means, and means responsive to a function requiring a predetermined call registration by the call-registering means and a predetermined maintenance of the door in open condition for rendering the hold means incapable of preventing closure of the door by the door-operating means.

24. In an elevator system, a structure having a pair of terminal landings and a plurality of intermediate landings, an elevator car having a door, door-operating means controllable to exert substantial forces for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, and protective mechanism responsive to the presence of an object in the closing path of the door, said protective mechanism cooperating with the door-operating means as the door during a closing movement nears an object in the closing path to materially reduce the force acting to close the door and to hold the door adjacent the object.

25. In an elevator system, a structure having a pair of terminal landings and a plurality of intermediate landings, an elevator car having a door, door-operating means controllable to exert substantial forces for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, and protective mechanism responsive to the presence of an object in the closing path of the door, said protective mechanism cooperating with the door-operating means as the door during a closing movement nears an object in the closing path to materially reduce the force acting to close the door and to hold the door adjacent the object, said protective mechanism cooperating with the door-operating means upon removal from the closing path of the door of an object adjacent which the closing door is held to increase the force acting to close the door.

26. In an elevator system, a structure having a pair of terminal landings and a plurality of intermediate landings, an elevator car having a door, door-operating means controllable to exert substantial forces for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, and protective mechanism responsive to the presence of an object in the closing path of the door, said protective mechanism cooperating with the door-operating means as the door during a closing movement nears an object in the closing path to materially reduce the force acting to close the door and to hold the door adjacent the object, said protective mechanism cooperating with the door-operating means upon movement in either of two directions along the closing path of the door of an object adjacent which the door is held for applying forces to the door moving the door substantially with the object.

27. In an elevator system, a structure having a pair of terminal landings and a plurality of intermediate landings, an elevator car having a door, door-operating means controllable to exert substantial forces for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, and protective mechanism responsive to the presence of an object in the closing path of the door, said protective mechanism cooperating with the door-operating means as the door during a closing movement nears an object in the closing path to materially reduce the force acting to close the door and to hold the door adjacent the object, said protective mechanism including first circuit means responsive to movement in a first direction along the closing path of an object against which the door is held, and second circuit means responsive to movement in a second direction along the closing path of an object against which the door is held, said protective mechanism and the door-operating means constituting a servomotor causing the door to follow movement along the closing path in either of two directions of an object adjacent which the door is held.

28. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, first retarding means operable during a door-closing operation for retarding closure of the door, second retarding means operable during a door-closing operation for retarding closure of the door, first translating means operating in response to the lapse without door closure of a substantial time for modifying the response of the door to operation of the first retarding means, and second translating means operating in response to the lapse without door closure of a time longer than said substantial time for modifying the response of the door to operation of the second retarding means.

29. A system as claimed in claim 28 wherein one of said retarding means operates in response to the presence of an object in the closing path of the door and the other of said retarding means has an operating device located within the elevator car, each of said translating means when operated being effected for preventing retardation of door closure by the associated retarding means.

30. In an elevator system, a structure having a plurality of landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car and opening of the door at said selected landing for initiating a door-closing operation of the door-operating means, signal means operable to signal in response to interference with orderly door closure, service demand means operable from a first condition to a second condition in response to a predetermined service demand, and signal control means responsive to the service demand means for permitting operation of the signal means only with the service demand means in the second condition.

31. In an elevator system, a structure having a plurality of landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car and opening of the door at said selected landing for initiating a door-closing operation of the door-operating means to close the door with substantial closing force, and door-control means effective when operated during a door-closure for reducing the closing force to a value appreciably less than said substantial closing force.

32. In an elevator system, a structure having a plurality of landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car and opening of the door at said selected landing for initiating a door-closing operation of the door-operating means to close the door with substantial closing force, door-control means operable during a closing operation of the door for preventing door closure, and expediting means responsive to a predetermined delay in closing of the door following initiation of a door-closing operation for rendering said door-control means ineffective for preventing door closure, said expediting means when operated acting to reduce the closing force of the door-operating means to a value appreciably less than said substantial closing force.

33. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, retarding means operable during a door-closing operation for retarding closure of the door, signal means for signaling operation of the retarding means, and control means effective only while the retarding means is in operated condition for actuating the signal means.

34. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, retarding means operable during a door-closing operation for retarding closure of the door, manually-operable means accessible to elevator-car passengers for operating the retarding means, time-controlled means effective a substantial time after initiation of a door-closing operation by the door-operating means for modifying operation of the retarding means, signal means responsive to operation of the manually-operable means for presenting a signal only for the duration of such operation, and control means effective only after expiration of said substantial time for permitting actuation of the signal means in response to operation of the manually-operable means.

35. In an elevator system, a structure having a pair of terminal landings and a plurality of intermediate landings, an elevator car having a door, door-operating means for opening and closing the door, means mounting the elevator car for movement relative to the structure to serve said landings, motive means for moving the elevator car, and control means cooperating with the motive means for controlling operation of the elevator car, said control means comprising means for stopping the elevator car at a selected landing and initiating a door-opening operation of said door-operating means, initiating means effective following the stopping of the elevator car at said selected landing and the door opening for initiating a door-closing operation of the door-operating means, retarding means operable during a door-closing operation for retarding closure of the door, and translating means responsive to continuous operation of the retarding means while the door is open for a substantial time larger than the normal-door-closing time.

36. In an elevator system, a structure having a plurality of landings, an elevator car having a passage through which an object may pass between the exterior and interior of the car, the car having a door and door-operating means for opening and closing the door, means mounting the elevator car for movement relative to the structure to serve the landings, motive means for moving the elevator car, call-registering means operable for registering a call for elevator service from each of the landings, and control means cooperating with the motive means for controlling operation of the elevator car, said control means comprising means for stopping the elevator car at a selected landing and initiating a door-opening operation of the door-operating means of the stopping elevator car to permit load transfer at the selected landing, means for initiating a door-closing operation after the door has reached open position, means responsive to door-closure while a call is registered by the call-registering means for operating the motive means to start the elevator car, and means responsive to a predetermined failure of the car to start following said door-closure for reopening the door.

References Cited in the file of this patent

UNITED STATES PATENTS 2,634,828 Bruns ---------------- Apr. 14, 1953